(12) United States Patent
Yamamoto

(10) Patent No.: US 8,696,421 B2
(45) Date of Patent: Apr. 15, 2014

(54) GAME SYSTEM AND METHOD OF USING OPERATION TIMING OF AN OPERATION UNIT IN A MUSICAL INPUT DEVICE

(75) Inventor: Takao Yamamoto, Minato-ku (JP)

(73) Assignee: Konami Digital Entertainment Co., Ltd., Minato-Ku, Tokyo (JP)

( * ) Notice: Subject to any disclaimer, the term of this patent is extended or adjusted under 35 U.S.C. 154(b) by 81 days.

(21) Appl. No.: 13/412,481

(22) Filed: Mar. 5, 2012

(65) Prior Publication Data

US 2012/0231862 A1 Sep. 13, 2012

(30) Foreign Application Priority Data

Mar. 8, 2011 (JP) ................................ 2011-050553

(51) Int. Cl.
*G10H 1/00* (2006.01)
*A63F 13/00* (2006.01)
*G09B 15/00* (2006.01)

(52) U.S. Cl.
USPC .................. 463/7; 84/470; 84/477; 463/31

(58) Field of Classification Search
USPC .......... 463/35, 37, 43, 7, 31, 436; 84/470, 477
See application file for complete search history.

(56) References Cited

U.S. PATENT DOCUMENTS

| | | | |
|---|---|---|---|
| 6,225,547 B1 | 5/2001 | Toyama et al. | |
| 6,390,923 B1 * | 5/2002 | Yoshitomi et al. | 463/43 |
| 6,425,822 B1 | 7/2002 | Hayashida et al. | |
| 7,521,619 B2 * | 4/2009 | Salter | 84/477 R |
| 8,556,718 B2 * | 10/2013 | Hashimoto | 463/36 |
| 2007/0197290 A1 * | 8/2007 | Ueshima | 463/36 |
| 2007/0232374 A1 * | 10/2007 | Lopiccolo et al. | 463/7 |
| 2011/0034247 A1 * | 2/2011 | Masuda et al. | 463/35 |
| 2011/0159957 A1 * | 6/2011 | Kawaguchi et al. | 463/31 |
| 2012/0135806 A1 * | 5/2012 | Nakano et al. | 463/36 |

FOREIGN PATENT DOCUMENTS

| | | | |
|---|---|---|---|
| JP | 2000-157723 A | | 6/2000 |
| JP | 2001-096061 A | | 4/2001 |
| JP | 2011030872 A | * | 2/2011 |

* cited by examiner

*Primary Examiner* — Dmitry Suhol
*Assistant Examiner* — Jason Yen
(74) *Attorney, Agent, or Firm* — Howard & Howard Attorneys PLLC

(57) ABSTRACT

A game system displays an operation instruction sign corresponding to each piece of operation timing and an operation reference sign corresponding to current time in a time ordering array along a route in one of operation guide domains, generates a relative displacement according to a time progress of the game such that the operation instruction sign is matched with the operation reference sign in the operation timing, and switches the route in which the relative displacement is generated between the operation guide domains according to a predetermined condition. Also, the game system includes sequence data having operation timing corresponding to one of the operation guide domains and operation timing corresponding commonly to the operation guide domains. And, the game system controls display of the operation instruction sign corresponding to each piece of operation timing such that continuity of the relative displacement is maintained before and after switching of the route.

16 Claims, 12 Drawing Sheets

GAME SYSTEM AND METHOD OF USING OPERATION TIMING OF AN OPERATION UNIT IN A MUSICAL INPUT DEVICE

CROSS REFERENCE TO RELATED APPLICATION

This application claims priority to Japanese Patent Application No. 2011-050553, filed Mar. 8, 2011, the disclosure of which is hereby incorporated by reference in its entirety.

TECHNICAL FIELD

The present invention relates to a game system that provides operation timing of an operation unit included in an input device through a game screen, and a method of controlling a computer used therein.

BACKGROUND ART

There is well known a game that provides the operation timing of the operation unit included in the input device through the game screen. In the game like this, there is well known a music game, in which a note bar corresponding to a rhythmic sound is displayed along a predetermined route on the game screen, and the note bar is moved toward an operation reference sign so as to be matched with the operation reference sign in the operation timing, thereby providing the operation timing (for example, see Patent Literature 1). In the music game like this, there is well known one in which the number of use tracks can be set as the predetermined route at the beginning of the game (for example, see Patent Literature 2). Patent Literature 1: Japanese Patent Publication Laid-Open No. 2001-96061 and Patent Literature 2: Japanese Patent Publication Laid-Open No. 2000-157723.

SUMMARY OF INVENTION

Technical Problem

In the game of Patent Literature 1, a relative displacement is generated between the note bar and the operation reference sign by moving the note bar along the predetermined route, and the operation timing is provided by the displacement. However, a position of the predetermined route and the number of predetermined routes are fixed. Therefore, for example, a moving direction of the note bar that is moved to provide the operation timing is not changed because. In the game of Patent Literature 1, the means for changing a difficulty level of the game is limited to a means for increasing or decreasing the number of note bars displayed on the game screen, or a means for uniformly increasing or decreasing a moving speed of the note bar displayed on the game screen. On the other hand, in the game of Patent Literature 2, the number of routes used is increased and decreased by the selection before the start of the game. Therefore, the difficulty level of the game can be changed. However, in the game of Patent Literature 2, the difficulty level of the game is not changed on a case-by-case basis according to a skill of the player. And, only the number of routes is changed, but the moving speed of the operation reference sign is not changed before and after the change. Therefore, sometimes the difficulty level of the game is insufficiently changed.

An object of the invention is to provide a game system that can change the difficulty level of the game during the progress of the game by switching the route in which the operation instruction sign is relatively displaced, and a method of controlling a computer used therein.

Solution to Problem

According to an embodiment of the invention, a game system comprising: an input device (4) that includes at least one operation unit (8G to 8O); a display device (5) that displays and outputs a game screen (50); a sequence data storage device (20) that stores sequence data (28) in which operation timing of the operation unit during the game is described; and an operation guide device (10) that provides the operation timing of the operation unit to a player, and wherein the operation guide device comprises: an operation timing determination device (10) that determines the operation timing, which is included within a predetermined time range of a current time toward a future on the game, of the operation unit based on the sequence data; a guide domain presenting device (10) that causes operation guide domains (52A,52B) including at least one route (R) corresponding to the operation unit to emerge on the game screen; a sign position control device (10) that displays an operation instruction sign (60) corresponding to each piece of operation timing determined by the operation timing determination device and an operation reference sign (55A,55B) corresponding to the current time in a time ordering array along the route in one of the operation guide domains, and generates a relative displacement according to a time progress of the game between the operation reference sign and the operation instruction sign such that a distance between the operation instruction sign and the operation reference sign is decreased along the route in association with a decrease in time difference between the current time and the operation timing that should be provided by the operation instruction sign, and such that the operation instruction sign is matched with the operation reference sign in the operation timing that should be provided by the operation instruction sign; and a route switching device that switches the route in which the relative displacement is generated between the operation guide domains according to a predetermined condition, and the sequence data includes operation timing corresponding to one of the operation guide domains and operation timing corresponding commonly to the operation guide domains, and the sign position control device controls display of the operation instruction sign corresponding to each piece of operation timing such that continuity of the relative displacement is maintained before and after switching of the route by the route switching device.

According to the present invention, the route in which the relative displacement is generated is switched between the domains according to the predetermined condition. Therefore, route characteristics such as a position in which the route is disposed, a direction in which the route extends, and a distance can be changed. And, the sequence data includes not only the operation timing corresponding to one of the operation guide domains but also the operation timing corresponding commonly to the operation guide domains. The operation instruction sign corresponding to the operation timing which is common to the operation guide domains can be disposed in both the route before the switching and the route after the switching. That is, the route in which the operation instruction sign during the relative displacement is disposed can be switched between the operation guide domains because of the existence of the operation timing, so that the characteristics of the route corresponding to the operation instruction sign during the displacement can be changed. Therefore, the difficulty level of the game can be changed during the progress of the game. Further, the continuity of the relative displacement is maintained before and after the switching, so that a natural transition to the route after the switching and a natural displacement on the route after the transition can be staged.

In an aspect of the present invention, the game system further includes a domain replacing device (10) that replaces arrays of the operation guide domains corresponding to the routes before and after the switching after the route switching device switches the route. In this case, the position of the operation guide domain where the relative displacement is generated is kept constant before and after the switching, so that the operation guide domain where the relative displacement is generated can be clarified.

The operation guide domains may have any positional relationship. For example, in an aspect of the present invention, the guide domain presenting device may cause the operation guide domains to emerge on the game screen such that the operation guide domains are deviated from each other in a up and down direction (U). In this case, the domain where the relative displacement is generated can be changed from the upper operation guide domain to the lower operation guide domain. In an aspect of the present invention, the guide domain presenting device may display a route that extends from a depth side of the game screen toward a front side as the route, and cause the operation guide domains to emerge in an array in which the operation guide domains are deviated in a depth direction (A) so as to be gradually located on the front side of the game screen from the upper operation guide domain toward the lower operation guide domain. In this case, when the operation instruction sign is moved from the upper operation guide domain to the lower operation guide domain by the switching, the operation instruction sign can be disposed in the position deviated in the depth direction before and after the movement. In the aspects of the present invention, the sign position control device may utilize the route in the uppermost operation guide domain in the operation guide domains as the route in which the relative displacement is generated.

In an aspect of the present invention, the guide domain presenting device may causes each operation guide domain to emerge with different lightness values before and after the route switching device switches the route such that the operation guide domain can be distinguished before and after the switching. In this case, since the operation guide domain can be distinguished before and after the switching by the lightness value, the player can easily recognize the distinction of each operation guide domain before and after the switching.

Any operation reference sign may be displayed as long as the relative displacement with the operation instruction sign is generated along one of the routes in the operation guide domains. For example, in an aspect of the present invention, the sign position control device may display the operation reference sign in each of the operation guide domains.

Operation units may be provided in the input device. Therefore, for example, in an aspect of the present invention, the operation units may be provided in the input device, the operation timing may be described in the sequence data while correlated with information specifying one of the operation units, and the operation guide device may display the operation instruction sign in an aspect in which the operation unit correlated with each operation timing can be distinguished. In an aspect of the present invention like this, the guide domain presenting device may cause the route divided in each operation unit to emerge in each of the operation guide domains, and the sign position control device may utilize each route of each of the operation guide domains as the route in which the operation instruction sign and the operation reference sign are displayed in an array of the time order, whereby the operation guide device may display the operation instruction sign in the aspect in which the operation unit corresponding to each piece of operation timing can be distinguished. Further, in this aspect, the guide domain presenting device may cause the operation guide domains to emerge on the game screen such that each operation guide domain having the different number of routes is included in the operation guide domains. In this case, since each route of the operation guide domain corresponds to the operation unit, the number of routes utilized and the number of operation units can be changed before and after the switching. Therefore, the difficulty level of the game can variedly be changed.

The relative displacement may be generated in any way. For example, in an aspect of the present invention, the sign position control device may generate the relative displacement by moving the operation instruction sign toward the operation reference sign.

In an aspect of the present invention, the game system may further include an estimation device (10) that estimates timing of the operation to the operation unit based on the operation timing specified by the sequence data. In this case, an estimation result can be utilized in the progress of the game. In the aspect like this, the route switching device may utilize the estimation result of the estimation device as the predetermined condition. In this case, the route can be switched according to the operation result of the player.

In an aspect of the present invention, the game system may further comprises: an audio output device (6) that plays back and outputs a sound; a musical composition data storage device (20) that stores musical composition data (25) which is used to play back the musical composition; and a musical composition playback device (10) that plays back the musical composition from the audio output device based on the musical composition data, and wherein the operation timing of the operation unit in playing back the musical composition is described in the sequence data. In this case, the music game that provides the operation timing corresponding to music rhythm to the player can be implemented.

Any input device may be utilized. For example, in an aspect of the present invention, a guitar controller (4) that emulates a guitar may be used as the input device, the guitar including a body (8D), a neck (8N) extending from the body, and a head (8H) disposed at a leading end of the neck.

According to another aspect of the invention, a method of controlling a computer (10) incorporated in a game machine comprising: an input device (4) that includes at least one operation unit (8G to 8O); a display device (5) that displays and outputs a game screen (50); a sequence data storage device (28) that stores sequence data (28) in which operation timing of the operation unit during the game is described; and wherein the method of controlling the computer comprises an operation guide step that provides the operation timing of the operation unit to a player, and the operation guide device further includes: an operation timing determination step that determines the operation timing, which is included within a predetermined time range of a current time toward a future on the game, of the operation unit based on the sequence data; a guide domain presenting step that causes operation guide domains including at least one route corresponding to the operation unit to emerge on the game screen; a sign position control step that displays an operation instruction sign corresponding to each piece of operation timing determined in the operation timing determination step and an operation reference sign corresponding to the current time in a time ordering array along the route in one of the operation guide domains, and generates a relative displacement according to a time progress of the game between the operation reference sign and the operation instruction sign such that a distance between the operation instruction sign and the operation reference sign is decreased along the route in association with a decrease in time difference between the current time and the operation timing that should be provided by the operation instruction sign, and such that the operation instruction sign is matched with the operation reference sign in the operation timing that should be provided by the operation instruction sign; and a route switching step that switches the route in which the relative displacement is generated between the operation guide domains according to a predetermined condition, and as the sequence data, sequence data including operation timing corresponding to one of the operation guide domains and operation timing corresponding commonly to the operation guide domains is used, and the sign position control step includes a step that controls display of the operation instruction sign corresponding to each piece of operation timing such that continuity of the relative displacement is maintained before and after switching of the route in the route switching step. The game system of the invention can be constructed by the method of controlling the computer of the invention.

In the above description, for the sake of easy understanding, the reference numeral in the accompanying drawings is added with a parenthesis. However, the invention is not limited to the embodiments.

As described above, according to the present invention, the difficulty level of the game can be changed in the progress of the game by switching the route in which the operation instruction sign is relatively displaced.

DESCRIPTION OF EMBODIMENTS

Figure 1:
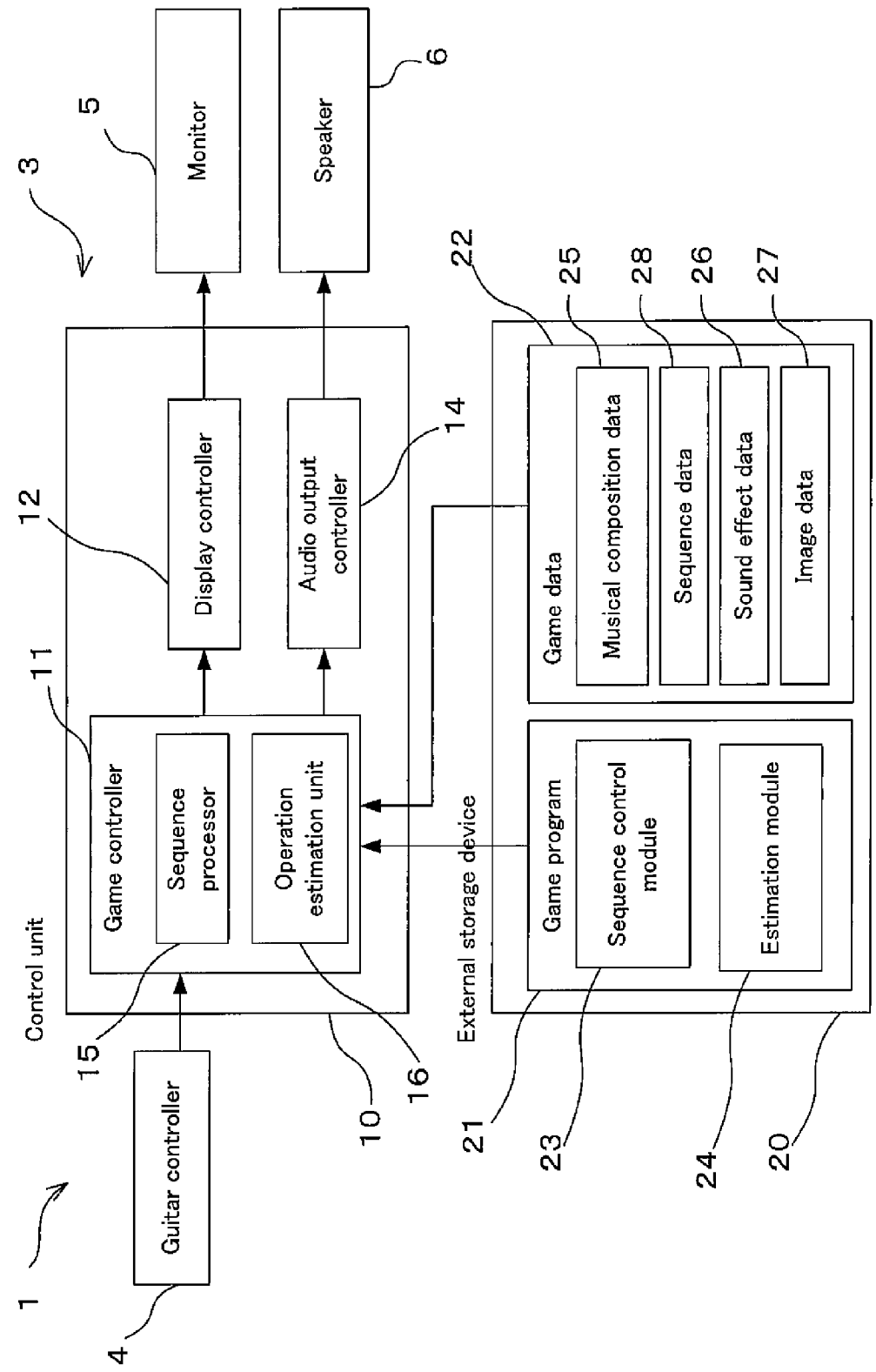
FIG. 1 is a functional block diagram of a game machine to which a game system according to an embodiment of the invention is applied.

A game machine to which a game system according to an embodiment of the invention is applied will be described below. FIG. 1 is a functional block diagram of the game machine to which the game system of the embodiment is applied. As illustrated in FIG. 1, a game machine 1 includes a game machine body 3, a guitar controller 4 as an input device, a monitor 5 as a display device, and a speaker 6 as an audio output device.

Figure 2:
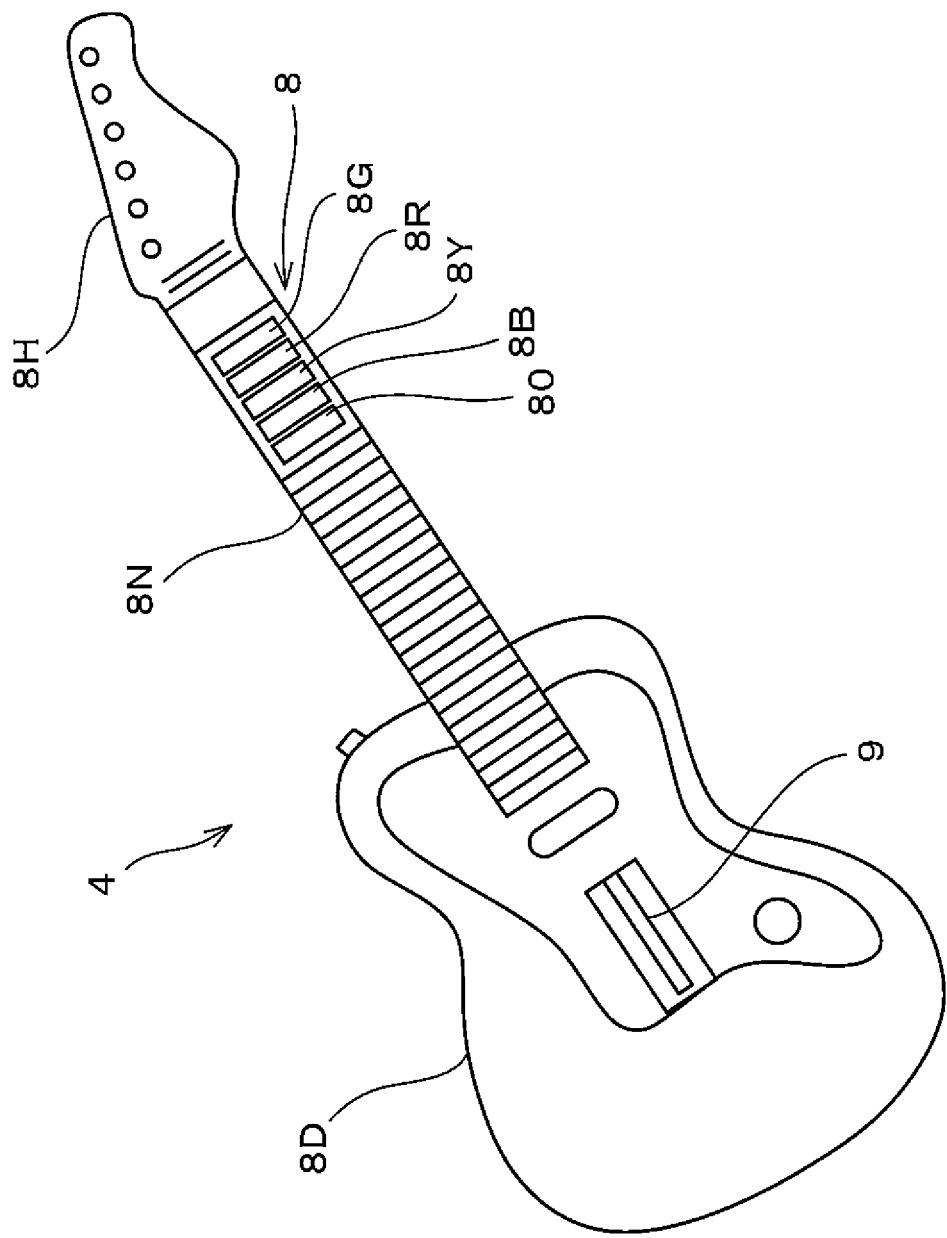
FIG. 2 is an enlarged view of a guitar controller.

FIG. 2 is an enlarged view of the guitar controller 4. The guitar controller 4 emulates a shape, a size, or the like of what is called a guitar. A head portion 8H corresponding to a head of the guitar, a neck portion 8N corresponding to a neck of the guitar, and a body portion 8D corresponding to a body of the guitar are provided in the guitar controller 4. A low-fret operation unit 8 is provided that is on the neck portion 8N near the head portion 8H in the guitar controller 4. The low-fret operation unit 8 includes five sound select buttons 8G, 8R, 8Y, 8B, and 8O that are color-coded in green, red, yellow, blue, and orange in the order from the side of the head portion 8H toward the side of the body portion 8D. When a player performs a selection operation to select the sound select buttons 8G to 8O, a different selection signal is output in each of the sound select buttons 8G to 8O.

A picking lever 9 is provided near the center of the body portion 8D in the guitar controller 4. The picking lever 9 is used to simulate an action to pluck a string of the guitar, and operated by the player like the string of the guitar. Therefore, the picking lever 9 is provided while being rotatable within a given range with an attachment portion to the body portion 8D as a supporting point. An elastic member (not illustrated) is provided in the attachment portion of the picking lever 9 such that the picking lever 9 is retained in the substantial center within the given range in which the picking lever 9 is rotatable. An operation detecting sensor (not illustrated) is provided in the picking lever 9. Therefore, when the player operates a rotation movement of the picking lever 9, the guitar controller 4 can detect the operation and output the operation as a signal. The player holds the guitar controller 4 as if the player held the guitar, and the player operates the buttons 8G to 8O and the picking lever 9 of the guitar controller 4 as if the player played the guitar. That is, the player performs a musical performance operation operating the picking lever 9 while selecting some of or all the sound select buttons 8G to 8O of the guitar controller 4. The sound select buttons 8G to 8O serves as operation units by cooperating with the picking lever 9.

As illustrated in FIG. 1, a control unit 10 as a computer is provided in the game machine body 3. The control unit 10 includes a game controller 11 as a main controller, and a display controller 12 and an audio output controller 14, which work in response to an output from the game controller 11. The game controller 11 is constructed as a unit in which a microprocessor and various peripheral devices, such as an internal storage device (for example, a ROM and a RAM), which are necessary for the action of the microprocessor are combined. The display controller 12 draws an image in a frame buffer according to drawing data provided from the game controller 11, and outputs a video signal corresponding to the drawn image to the monitor 5, thereby displaying a predetermined image on the monitor 5. The audio output controller 14 generates an audio playback signal corresponding to audio playback data provided from the game controller 11, and outputs the audio playback signal to the speaker 6, thereby playing back a predetermined musical composition (including a sound effect) from the speaker 6.

The guitar controller 4 is connected to the control unit 10. In addition, various input devices such as a controller in which a press button switch, a cross-key, and the like are provided may be connected to the control unit 10. An external storage device 20 is connected to the game machine body 3. A storage medium, such as an optical storage medium such as a DVD-ROM and a CD-ROM and a nonvolatile semiconductor memory device such as an EEPROM, in which data can be stored without supplying an electric power, is used as the external storage device 20. The game machine body 3 is connected to the external storage device 20, and then the control unit 10 is allowed to read various programs and various pieces of data that are stored in the external storage device 20.

A game program 21 and game data 22 are stored in the external storage device 20. The game program 21 is a computer program that is necessary to execute the music game according to a predetermined procedure in the game machine 1. In the game program 21, there are a sequence control module 23 and an estimation module 24 in order to implement the functions of the invention. When the game machine body 3 is started up, the game controller 11 executes an operation program stored in the internal storage device and executes various pieces of processing necessary for the action as the game machine 1, and next, reads the game program 21 from the external storage device 20 and executes the game program 21, thereby setting an environment to execute the music game according to the game program 21. The game controller 11 executes the sequence control module 23 of the game program 21, thereby generating a sequence processor 15 in the game controller 11. The game controller 11 executes the estimation module 24 of the game program 21, thereby generating an operation estimation unit 16 in the game controller 11. The sequence processor 15 and the operation estimation unit 16 are logical device that are implemented by a combination of computer hardware and the computer program.

The sequence processor 15 executes music game processing for issuing an instruction to the player to perform the operation according to the playback of the music (musical composition) selected by the player, generating a sound effect in response to the operation of the player, or the like. The operation estimation unit 16 executes processing for estimating the operation of the player, controlling the game according to the estimation result, or the like. In addition to the modules 23 and 24, the game program 21 includes various program modules necessary to execute the music game, and logical devices corresponding to the modules are generated in the game controller 11. However, the illustrations of them are omitted.

In the game data 22, there are included various pieces of data that should be referred to in executing the music game according to the game program 21. For example, musical composition data 25, sound effect data 26, and image data 27 are included in the game data 22. The musical composition data 25 is data that is necessary to play back and output the musical composition of a game target from the speaker 6. Although one kind of the musical composition data 25 is illustrated in FIG. 1, actually the player can select the playing musical composition from the musical compositions. The pieces of musical composition data 25 are stored in the game data 22 while information identifying the musical composition is added to the musical composition. The sound effect data 26 is data in which kinds of sound effects to be output from the speaker 6 in response to the operation of the player are stored while each sound effect is correlated with a unique code. The sound effect includes various kinds of sounds such as an instrument. The sound effect data is prepared as many as predetermined octaves while a music interval is changed with respect to each kind of the sound. The image data 27 is data that is used to display a background image in the game screen, various objects, and an icon on the monitor 5.

The game data 22 also includes sequence data 28. The sequence data 28 is data in which the operation instruction to be issued to the player is defined. The sequence data 28 is described in detail later.

Figure 3:
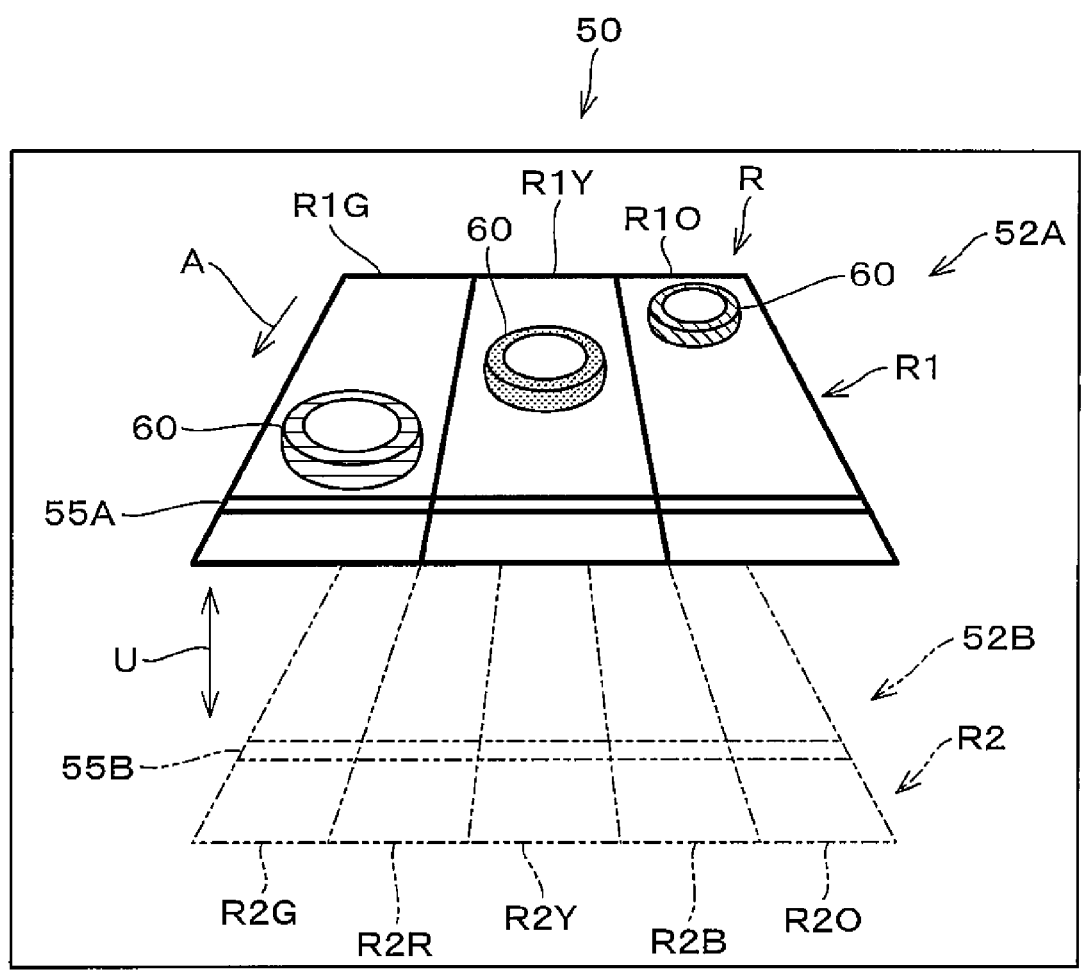
FIG. 3 is a view schematically illustrating an example of a game screen.

Next, an outline of the music game executed by the game machine 1 will be described below. The game machine 1 is configured as the music game machine, in which the player performs the operation to the music and operation timing of the operation is estimated. FIG. 3 is a view schematically illustrating an example of a game screen of the game executed by the game machine 1. A game screen 50 includes two operation guide domains 52A and 52B for guiding the proper operation timing of the guitar controller 4 to the player. In addition, the game screen 50 also includes a domain for guiding a score of the player or the like. However, the illustration of the domain is omitted.

The operation guide domains 52A and 53B are disposed while vertically deviated from each other, and there is a darklight change between the operation guide domains 52A and 52B. Specifically, the lightness is differentiated such that the upper operation guide domain is brighter (denser) than the lower operation guide domain. An arrow U in FIG. 3 indicates the vertical direction (up and down direction). In the example in FIG. 3, the first operation guide domain 52A is disposed in the upper portion, and displayed brighter than the second operation guide domain 52B disposed below the first operation guide domain 52A. In addition, at the beginning of the game, as an initial position, the first operation guide domain 52A is disposed in the upper portion, namely, disposed above the second operation guide domain 52B.

As illustrated in FIG. 3, both the operation guide domains 52A and 52B are formed into a trapezoidal shape in which a width is gradually increased from the depth side in FIG. 3 toward the front side. Lanes R as routes are set in each of the operation guide domains 52A and 52B. The lane R in each of the operation guide domains 52A and 52B is extends from the depth side toward the front side. The operation guide domains 52A and 52B are disposed while deviated from each other in the depth direction. Specifically, the operation guide domains are disposed such that the upper operation guide domain is deviated in a depth-side direction and such that the lower operation guide domain is deviated in a front-side direction rather than the upper operation guide domain. Therefore, in the example in FIG. 3, a first lane group R1 set to the first operation guide domain 52A is disposed so as to extend from a position deeper than a second lane group R2 set to the second operation guide domain 52B to a position in the middle of the second lane group R2.

The first lane group R1 of the first operation guide domain 52A includes three lanes R1G, R1Y, and R1O corresponding to the three sound select buttons 8G, 8Y, and 8O in the sound select buttons 8G to 8O provided in the guitar controller 4. The first green lane R1G corresponding to the green sound select button 8G, the first yellow lane R1Y corresponding to the yellow sound select button 8Y, and the first orange lane R1O corresponding to the orange sound select button 8O are sequentially disposed from the left in FIG. 3.

On the other hand, the second lane group R2 of the second operation guide domain 52B includes five lanes R2G, R2R, R2Y, R2B, and R2O corresponding to the five sound select buttons 8G to 8O provided in the guitar controller 4. The second green lane R2G corresponding to the green sound select button 8G, the second red lane R2R corresponding to the red sound select button 8R, the second yellow lane R2Y corresponding to the yellow sound select button 8Y, the second blue lane R2B corresponding to the blue sound select button 8B, and the second orange lane R2O corresponding to the orange sound select button 8O are sequentially disposed from the left in FIG. 3. In the example in FIG. 3, the first green lane R1G of the first lane group R1 is located above the second green lane R2G of the second lane group R2 so as to correspond to the second green lane R2G, the first yellow lane R1Y is disposed so as to be located above the second yellow lane R2Y, and the first orange lane R1O is disposed so as to be located above the second orange lane R2O. In the example in FIG. 3, in order to express the difference in lightness, the lanes R2G, R2R, R2Y, R2B, and R2O included in the second operation guide domain 52B disposed below are indicated by an alternate long and two short dashes line.

Decision lines 55A and 55B as operation reference signs are provided in the operation guide domains 52A and 52B, respectively. The first decision line 55A of the first operation guide domains 52A is disposed on the front side of the first lane group R1, and the second decision line 55B of the second operation guide domain 52B is disposed on the front side of the second lane group R2. Both the decision lines 55A and 55B are formed into a linear shape extending in a horizontal direction in FIG. 3. Since the first lane group R1 and the second lane group R2 are disposed while deviated in the depth direction, the decision lines 55A and 55B are also disposed while deviated in the depth direction. Specifically, the decision line of the lower lane group is located on the front side rather than the decision line of the upper lane group. Therefore, in the example in FIG. 3, the upper first decision line 55A is deviated onto the depth side rather than the lower second decision line 55B, and disposed so as to be located above the position in the middle of the second lane group R2.

During execution of the music game, namely, during the progress of the musical composition, objects 60 as operation instruction signs are displayed in each lane of the upper operation guide domain according to the sequence data 28. The object 60 emerges on the depth side of the lane in proper timing of the musical composition, and is gradually displaced toward the front side in the progress of the musical composition. That is, the object 60 moves from the depth side toward the front side in the progress of the musical composition. A size of the object 60 is gradually increased as the object 60 moves from the depth side toward the front side. Therefore, a virtual 3D space is produced such that the object 60 closes on near gradually from a distance. The color corresponding to the lane R is added to the object 60 disposed on the lane R.

The proper musical performance operation to the guitar controller is required to the player 4 in tune with an arrival of the object 60 at the decision line located in a front portion of the lane R on which the object 60 is moving. Specifically, in tune with the arrival of the object 60 at the decision line, there is required the musical performance operation operating the picking lever 9 while selecting one of the sound select buttons corresponding to the lane R on which the object 60 is moving to the player. A mismatched time between a time the object 60 is matched with the decision line and a time the player performs the musical performance operation is detected when the player performs the musical performance operation. The operation of the player is highly valued with decreasing mismatched time. And, the sound effect is played back from the speaker 6 according to the touch operation.

In the example in FIG. 3, the first operation guide domain 52A is disposed in the upper portion. Therefore, the objects 60 are displayed in the first lane group R1 of the first operation guide domain 52A. An arrow A in FIG. 3 indicates a displacement direction of the object 60, namely, the direction from the depth side in the depth direction toward the front side. In the example in FIG. 3, the object 60 is disposed in each lane R of the first lane group R1. And, the object 60 disposed on the first green lane R1G is colored green, the object 60 disposed on the first yellow lane R1Y is colored yellow, and the object 60 disposed on the first orange lane R1O is colored orange. In the example in FIG. 3, the object 60 displayed on the first green lane R1G almost reaches the first decision line 55A. Therefore, the player may perform the musical performance operation operating the picking lever 9 while selecting the sound select button 8G of the guitar controller 4, in tune with the arrival of the object 60 at the first decision line 55A.

Figure 4:
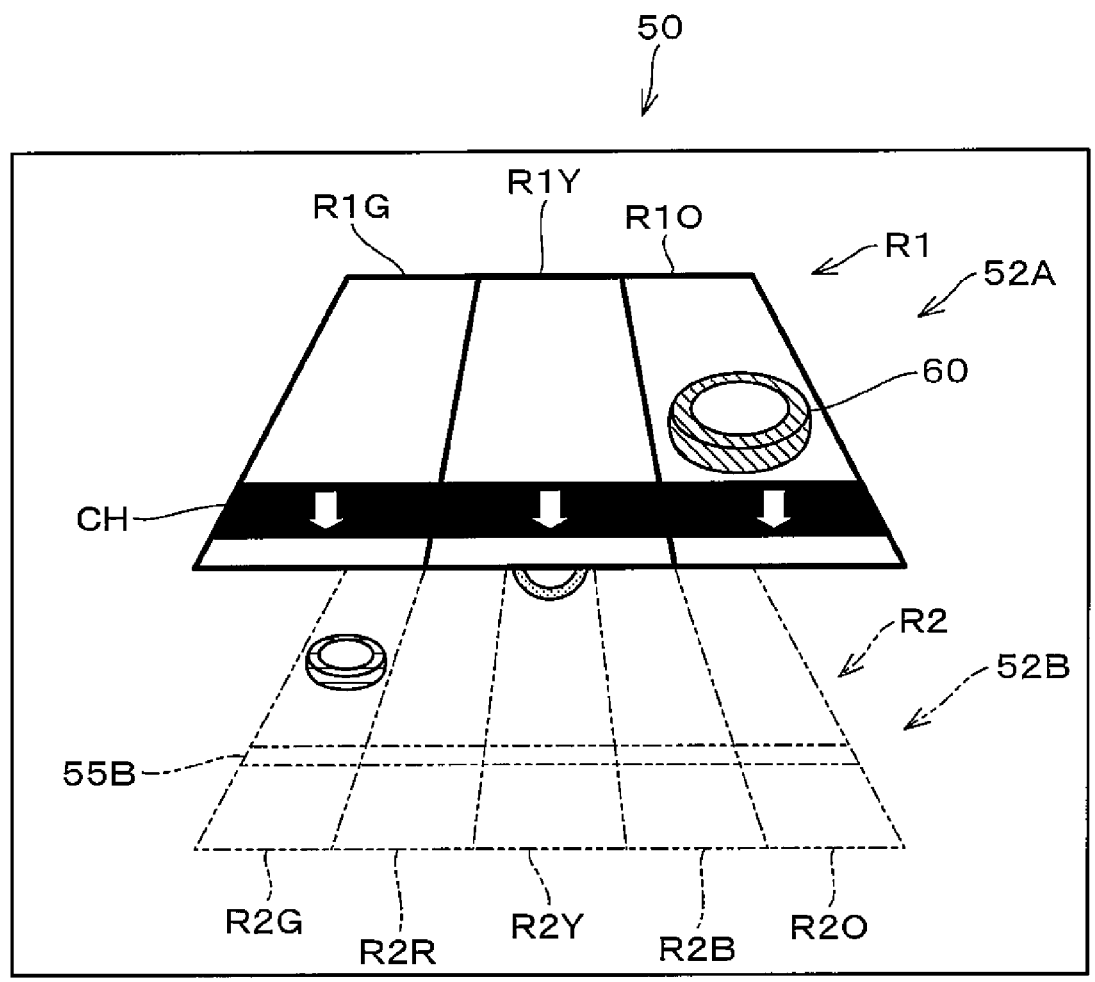
FIG. 4 is a view schematically illustrating the game screen in a state in which a hole is made in one of operation guide domains.

Sometimes a hole, which is connected to the lane of the lower operation guide domain, is made in the lane of the upper operation guide domain in proper timing of the musical composition. The object 60 that moves on the lane of the upper operation guide domain falls on the lane of the lower operation guide domain through the hole. That is, the moving route of the object 60 is switched from the upper lane to the lower lane by the hole. FIG. 4 is a view schematically illustrating the game screen in the state in which the hole is made in one of the operation guide domains.

When the game screen 50 in FIG. 3 is compared to the game screen 50 in FIG. 4, a hole CH is made in the upper first operation guide domain 52A in the game screen 50 in FIG. 4. As illustrated in FIG. 4, the hole CH is located in a range from the position slightly deeper than the position at which the first decision line 55A of the first lane group R1 has been provided to the neighborhood of the position at which the first decision line 55A has been provided. The object 60 that is moving on the first lane group R1 falls in the lower second lane group R2 through the hole CH before arriving at the first decision line 55A. In the example in FIG. 4, the object 60 on the first green lane R1G already falls in the second green lane R2G, and the object 60 on the first yellow lane R1Y is falling in the second yellow lane R2Y.

As illustrated in FIG. 4, through the falling from the hole CH, the object 60 on the first lane group R1 moves to the position on the second lane group R2 corresponding to the position of the hole CH. The operation timing that should be guided by the object 60 does not change before and after the falling. That is, by the movement onto the second lane group R2, the object 60, which is moving on the first lane group R1 to guide the timing of the musical performance operation by the arrival at the first decision line 55A, moves on the second lane group R2 to arrive at the second decision line 55B instead of the first decision line 55A in the timing in which the object 60 should arrive at the first decision line 55A. On the other hand, since the first lane group R1 and the second lane group R2 are located while deviated in the depth direction, the object 60 on the first lane group R1 is disposed on the second lane group R2 such that a distance to the decision line is lengthened by the falling. Therefore, the moving speed of the object 60 changes by the change in distance to the decision line by the falling. In the example in FIG. 4, the position of the hole CH corresponds to the position near the middle of the second lane group R2. Therefore, after the falling, the moving speed of each object 60 becomes faster than the moving speed at which the object 60 moves on the first lane group R1.

Figure 5:
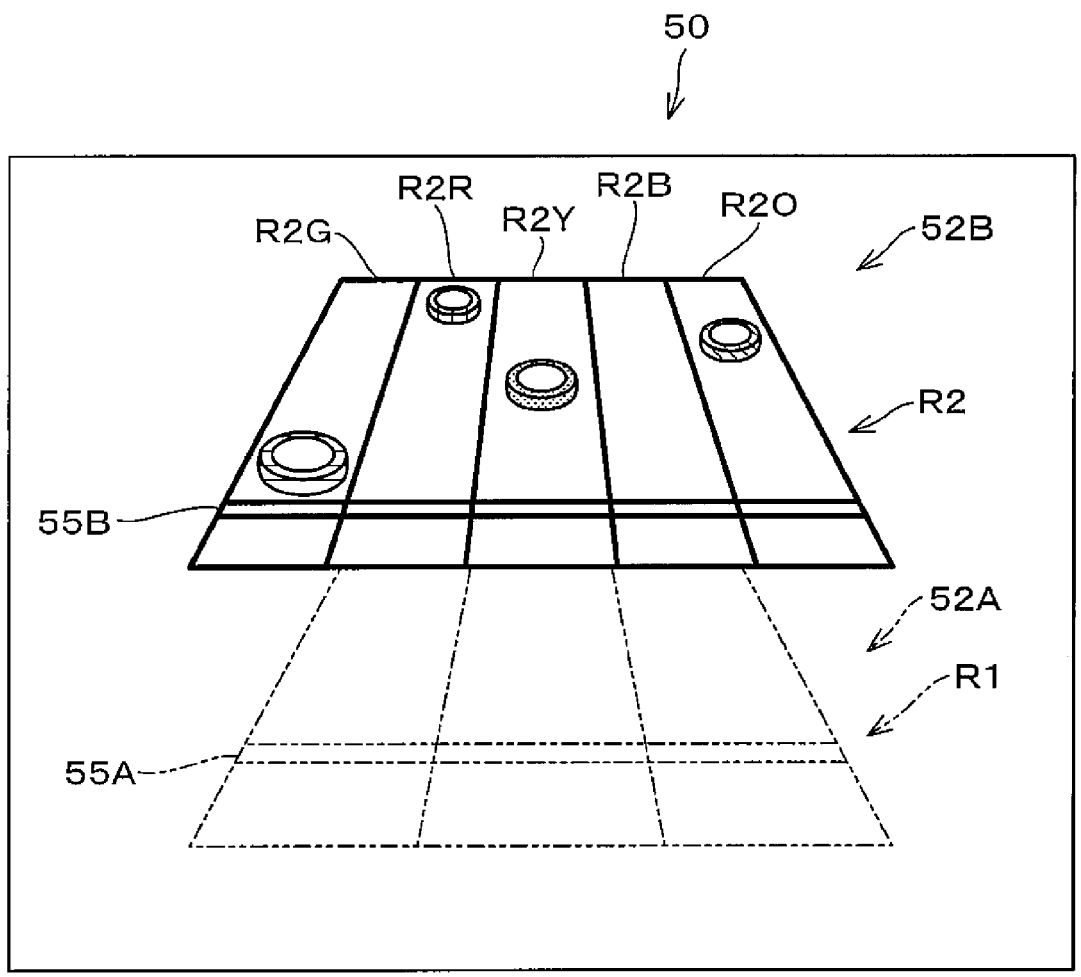
FIG. 5 is a view schematically illustrating the game screen after a given time elapses since the game screen in FIG. 4.

FIG. 5 is a view schematically illustrating the game screen after a given time elapses since the game screen in FIG. 4. Specifically, FIG. 5 illustrates the game screen 50 after all the objects 60 moving on the first lane group R1 move to the second lane group through the hole CH on the game screen 50 in FIG. 4. As illustrated in FIG. 5, after all the objects 60 on the first lane group R1 move to the second lane group R2, the upper first operation guide domain 52A is replaced with the lower second operation guide domain 52B. That is, the second operation guide domain 52B is disposed above the first operation guide domain 52A, and the first operation guide domain 52A is disposed below the second operation guide domain 52B. Therefore, the lightness of the first operation guide domain 52A and the lightness of the second operation guide domain 52B are also inverted. That is, the lightness of the second operation guide domain 52B located in the upper portion becomes higher, and the lightness of the first operation guide domain 52A located in the lower portion becomes lower. In the example in FIG. 5, the lower first operation guide domain 52A having the lower lightness is illustrated by the alternate long and two dashes line. After the operation guide domains 52A and 52B are replaced with each other in the vertical array, in the progress of the musical composition, the object 60 emerges on the depth side of the upper second operation guide domain 52B in proper timing, and moves toward the second decision line 55B on the front side.

As illustrated in FIG. 5, the operation guide domains 52A and 52B are disposed while deviated in the depth direction such that the upper second operation guide domain 52B is located on the depth side while the lower first operation guide domain 52A is located on the front side. Sometimes the hole CH, which is connected to the lower first operation guide domain 52A, is made in the upper second operation guide domain 52B in proper timing of the musical composition. Similarly to the case that the first operation guide domain 52A is located in the upper portion, the object 60 on the second lane group R2 falls in the first lane group R1 through the hole CH. Also, after all the moving objects 60 fall in the lower first operation guide domain 52A, the positions of the first operation guide domain 52A and second operation guide domain 52B are replaced with each other again. Thus, the emergence of the hole CH in the upper operation guide domain, the falling of the object 60 through the hole CH, and the replacement of the operation guide domains in the vertical array are repeated in the progress of the game.

In addition, in the case that the object 60 moves from the second operation guide domain 52B to the first operation guide domain 52A, in a correspondence relationship between the first lane group R1 and the second lane group R2, similarly to the case that the first operation guide domain 52A is located in the upper portion, the second green lane R2G may be set so as to correspond to the first green lane R1G located at the left end, the second yellow lane R2Y may be set so as to correspond to the first yellow lane R1Y located in the center, and the second orange lane R2O may be set so as to correspond to the first orange lane R1O located at the right end. Or, the correspondence relationship between the lanes of the first lane group R1 and the sound select buttons 8G to 8O may change with the downward movement such that the left end of the first lane group R1 corresponds to the red sound select button 8R and such that the right end of the first lane group R1 corresponds to the blue sound select button 8B, and the objects 60 may move from the second lane group R2 to the first lane group R1 such that the sound select buttons 8G to 8O are commonalized. The movement of the object 60 is not limited to the movement that is performed between the lane groups R1 and R2 such that each of the sound select buttons 8G to 8O is commonalized. For example, as long as the sound select buttons 8G to 8O which should be instructed to the player by each object 60 can be distinguished from one another by providing the color corresponding to each of the sound select buttons 8G to 8O to the object 60, and other, the movement between the lane groups R1 and R2 is not limited to the movement between the lanes in which each of sound select buttons 8G to 8O is communalized. That is, the sound select buttons 8G to 8O which should be instructed to the player by each object 60 may change by the movement between the lane groups R1 and R2.

Figure 6:
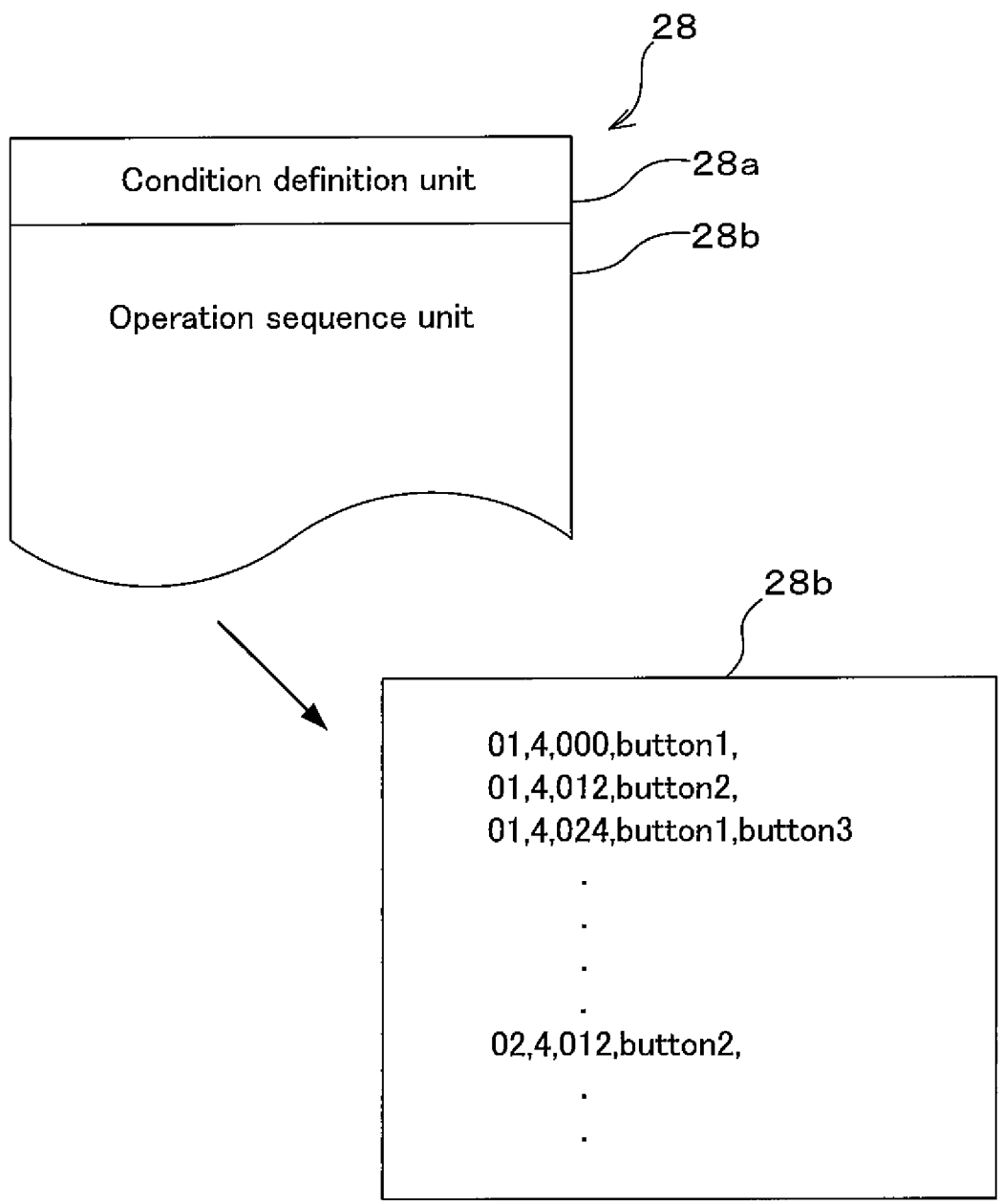
FIG. 6 is a view illustrating an example of contents of sequence data for a first operation guide domain.

Next, the sequence data 28 will be described in detail with reference to FIGS. 6 and 7. The sequence data 28 is prepared in each of the operation guide domains 52A and 52B. Therefore, at least the two pieces of sequence data 28 are prepared for one piece of musical composition data. FIG. 6 is a view illustrating an example of contents of the sequence data 28 for the first operation guide domain 52A. As illustrated in FIG. 6, the sequence data 28 includes a condition definition unit 28a and an operation sequence unit 28b. Pieces of information specifying different game execution conditions depending on the musical composition, such as pieces of information specifying a tempo, a beat, and a track of the music and the sound effect that should be generated in performing the touch operation of the object 60, are described in the condition definition unit 28a. In addition, in FIG. 6, the condition definition unit 28a is provided only in the head of the sequence data 28. However, the condition definition unit 28a may be added to a proper position in the middle of the operation sequence unit 28b. Therefore, pieces of processing such as a change in tempo in the musical composition and a change in allocation of the sound effect can be actualized.

On the other hand, the timing in which the musical performance operation should be performed to each of the sound select buttons 8G to 8O is described in the operation sequence unit 28b while correlated with the information specifying each of the sound select buttons 8G to 8O. That is, as partially illustrated in FIG. 6, the operation sequence unit 28b is constructed as a set of recodes, in which the timing (operation timing) in which the musical performance operation should be performed in the musical composition and the information specifying the operation unit (sound select button) are correlated with each other.

The operation timing is described in such a manner that values indicating a bar number, the number of beats, and a time in the beat in the musical composition are divided by a comma. The time in the beat means an elapsed time since a head of one beat, and is expressed by the number of units (hereinafter sometimes the number of units is referred to as a frame) from the head of the beat when a time length of one beat is equally divided into n unit times. For example, in the case of n=100, when the second beat of one bar of the musical composition and the time that elapses by ¼ from the head of the beat is specified as the operation timing, the operation timing is described as "01,2,025".

The operation unit is described as "button 1" in the case that the green sound select button 8G is specified, the operation unit is described as "button 2" in the case that the yellow sound select button 8Y is specified, the operation unit is described as "button 3" in the case that the orange sound select button 8O is specified, the operation unit is described as "button 4" in the case that the red sound select button 8R is specified, and the operation unit is described as "button 5" in the case that the blue sound select button 8B is specified.

The specification of each of the sound select buttons 8G to 8O corresponds to the specification of the lane R corresponding to each of the sound select buttons 8G to 8O. That is, the description of "button 1" corresponds to the specification of the first green lane R1G or second green lane R2G corresponding to the green sound select button 8G. Thus, sometimes one sound select button corresponds to two lanes of the lane corresponding to the first lane group R1 and the lane corresponding to the second lane group R2. In such cases, the description of "button 1" corresponds to the specification of the lane in the lane group disposed in the upper portion of the game screen 50 of the two corresponding lanes. Similarly, the description of "button 2" corresponds to the specification of the first yellow lane R1Y or second yellow lane R2Y, the description of "button 3" corresponds to the specification of the first orange lane R1O or second orange lane R2O, the description of "button 4" corresponds to the specification of the second red lane R2R, and the description of "button 5" corresponds to the specification of the second blue lane R2B. In the case that the two lanes correspond to one button, the description corresponds to the specification of the lane group located in the upper portion of the game screen 50.

In the example in FIG. 6, the operation sequence unit 28b corresponding to the first operation guide domain 52A is illustrated. In the example in FIG. 6, the operation timing and the operation unit are specified such that the musical performance operation operating the picking lever 9 while the green sound select button 8G is selected is performed at a starting point (000) in the fourth beat of the first bar, and such that the musical performance operation operating the picking lever 9 while the yellow sound select button 8Y is selected is performed in the timing in which the time elapses by "012" since the starting point in the fourth beat of the first bar. Also, in the timing in which the time elapses by "024" since the starting point in the fourth beat of the first bar, there is issued an instruction such that the musical performance operation operating the picking lever 9 while both the green sound select button 8G and the orange sound select button 8O are selected is performed.

When the example in FIG. 6 is applied to the game screen 50 in the example in FIG. 3 on which the first operation guide domain 52A is disposed in the upper portion, the example in FIG. 6 also corresponds to the instructions of the lane R on which the object 60 should be displayed and the timing in which the object 60 should arrived at each of the decision lines 55A and 55B such that the object 60 is displayed on the first green lane R1G, and such that the object 60 is moved so as to arrive at the first decision line 55A on the first green lane R1G at the starting point (000) in the fourth beat of the first bar. Similarly, the instruction to move the object 60 while displaying the object 60 on the first yellow lane R1Y is issued such that the object 60 arrives at the first decision line 55A on the first yellow lane R1Y in the timing in which the time elapses by "012" since the starting point in the fourth beat of the first bar. Also, the instruction to move the objects 60 while displaying the objects 60 on the lanes R1G and R1O is issued such that the objects 60 arrive at the first decision line 55A on the first green lane R1G and first orange lane R1O in the timing in which the time elapses by "024" since the starting point in the fourth beat of the first bar.

Figure 7:
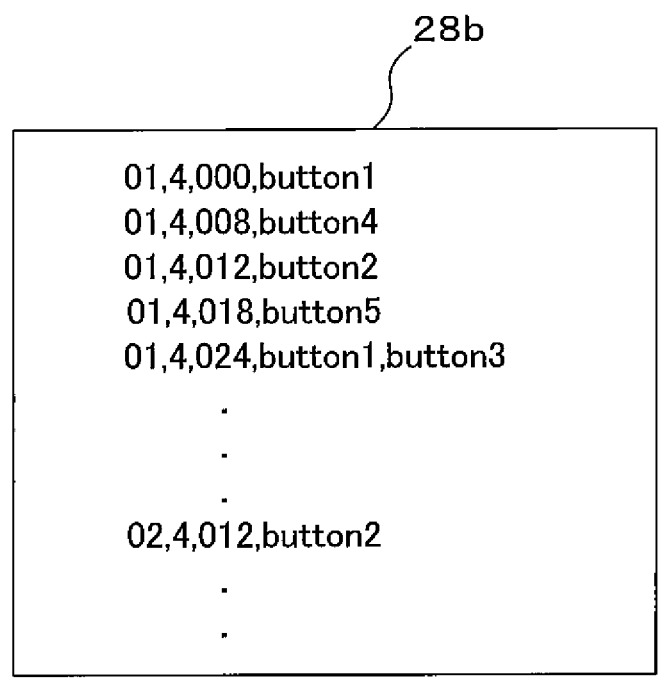
FIG. 7 is a view illustrating an example of contents of sequence data for a second operation guide domain.

On the other hand, FIG. 7 is a view illustrating an example of contents of the sequence data 28 for the second operation guide domain 52B. The example in FIG. 7 corresponds to the same musical composition as the example in FIG. 6, and illustrates the sequence data 28 for the second operation guide domain 52B, which corresponds to the sequence data 28 for the first operation guide domain 52A in FIG. 6. In FIG. 7, the condition definition unit 28a is omitted. As illustrated in FIG. 7, compared to the operation sequence unit 28b in FIG. 6, the descriptions of "button 4" and "button 5" are added to the operation sequence unit 28b in the sequence data 28 for the second operation guide domain 52B. That is, the specification of the musical performance operation timing of each of the red sound select button 8R and the blue sound select button 8B is added to the specification of the musical performance operation timing of each of the sound select buttons 8G, 8Y, and 8O in common with the example in FIG. 6. Specifically, in the example in FIG. 7, the instruction, in which the musical performance operation operating the picking lever 9 while the red sound select button 8R is selected is performed in the timing in which the time elapses by "008" since the starting point in the fourth beat of the first bar, and the instruction, in which the musical performance operation operating the picking lever 9 while the blue sound select button 8B is selected is performed in the timing in which the time elapses by "018" since the starting point in the fourth beat of the first bar, are added to the musical performance operation of the example in FIG. 6. In the example of FIG. 7, the number of difficulty levels is increased since the number of pieces of timing of the musical performance operation is increased compared to the example of FIG. 6. Information distinguishing the pieces of sequence data 28 for the operation guide domains 52A and 52B from each other is added to the sequence data 28. The sequence data 28 corresponding to the operation guide domain disposed in the upper portion of the game screen 50 is used in the pieces of sequence data 28 for the operation guide domains 52A and 52B, which are prepared for the same musical composition data.

Next, the processing of the game controller 11 in executing the music game in the game machine 1 will be described below. The game controller 11 waits for the instruction to start the game from the player after reading the game program 21 and completing an initial setting necessary to execute the music game. For example, the instruction to start the game includes the operation to specify the data used in the game, such as the musical composition played in the game and the selection of the difficulty level. A procedure for receiving the instructions may be identical to that of the well-known game or the like.

When the instruction to start the game is issued, the game controller 11 reads the musical composition data 25 corresponding to the musical composition selected by the player, and outputs the musical composition data 25 to the audio output controller 14 to start the playback of the musical composition from the speaker 6. Therefore, the control unit 10 serves as a musical composition playback device. Also, the game controller 11 reads the sequence data 28 corresponding to the selection of the player in synchronization with the playback of the musical composition, generates the image data necessary to draw each of the operation guide domains 52A and 52B while referring to the image data 27, and outputs the image data to the display controller 12 to display the operation guide domains 52A and 52B on the monitor 5. Further, during the execution of the music game, the game controller 11 repeatedly executes a sequence processing routine in FIG. 8, a switching data producing processing in FIG. 9, a switching processing in FIG. 10, a disposition replacing routine in FIG. 11, and an operation estimation routine in FIG. 12 with a predetermined period as the processing necessary to display the operation guide domains 52A and 52B. In addition, the sequence processor 15 handles the routines in FIGS. 8, 9, 10, and 11, and the operation estimation unit 16 handles the operation estimation routine in FIG. 12.

Figure 8:
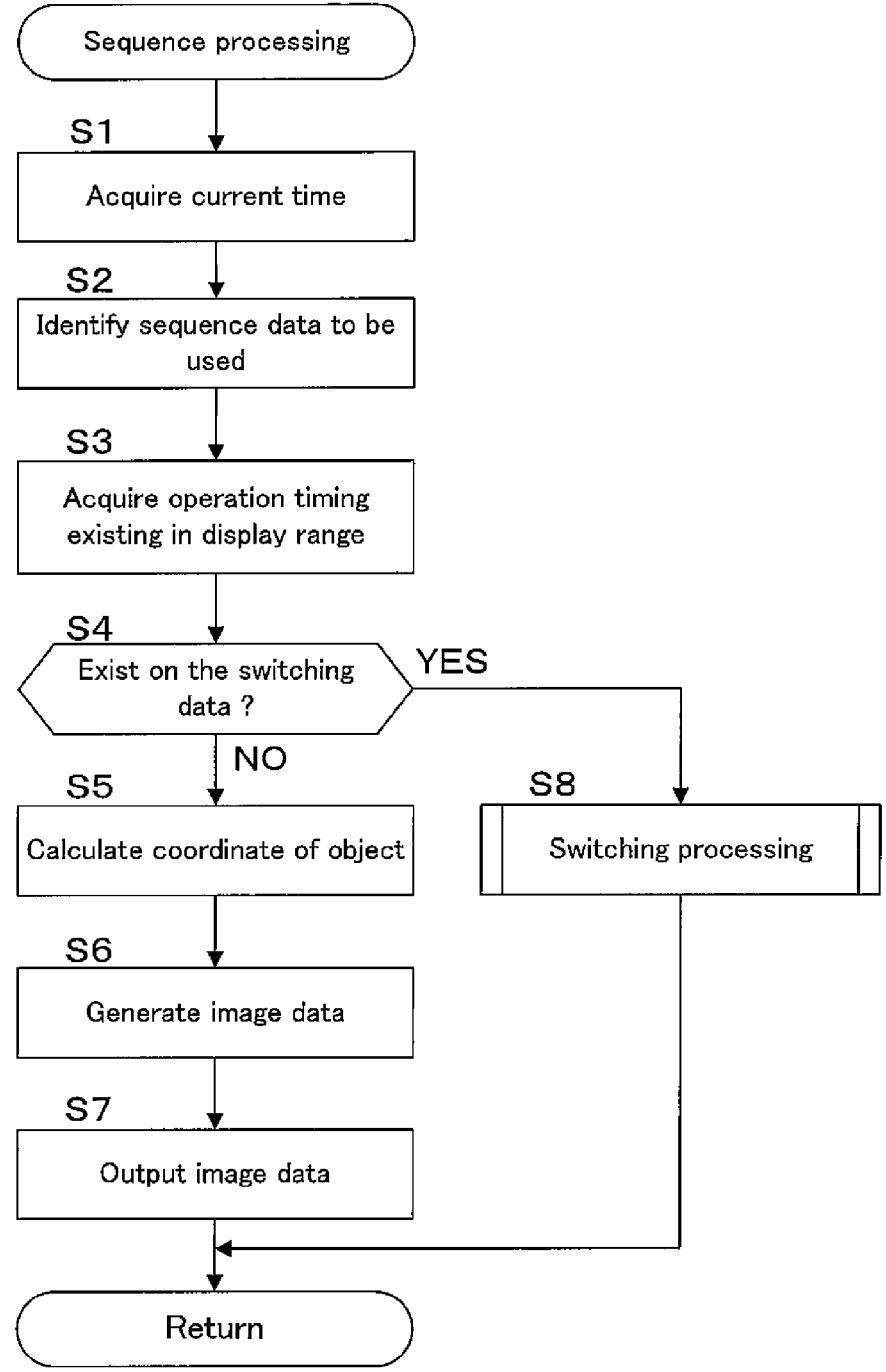
FIG. 8 is a view illustrating an example of a flowchart of a sequence processing routine.

FIG. 8 is a view illustrating an example of a flowchart of the sequence processing routine executed by the sequence processor 15. When the routine in FIG. 8 is started, the sequence processor 15 of the game controller 11 acquires a current time on the musical composition in Step S1. For example, the time is started to be measured using an internal clock of the game controller 11 based on the playback starting point of the musical composition, and the current time is acquired from the value of the internal clock. In Step S2, the sequence processor 15 identifies the sequence data 28 to be used in the pieces of sequence data 28 for each of the operation guide domains 52A and 52B. Specifically, the sequence processor 15 determines which one of the operation guide domains 52A and 52B is disposed in the upper portion, and the sequence processor 15 identifies the sequence data 28 corresponding to the upper operation guide domain as the sequence data 28 to be used. In Step S3, the sequence processor 15 acquires the data of the operation timing existing in the time length corresponding to the display range of the operation guide domain from the sequence data 28 identified in Step S2. By way of an example, the display range is set to a time range corresponding to the two bars of the musical composition from the current time toward the future.

In Step S4, the sequence processor 15 determines whether or not the operation timing acquired in Step S3 exists on the switching data. The detailed switching data is described later. When the negative determination is made in Step S4, namely, when the operation timing acquired in Step S3 does not exist on the switching data, the flow goes to Step S5. On the other hand, when the affirmative determination is made in Step S4, namely, when the operation timing acquired in Step S3 exists on the switching data, the flow goes to Step S8 to execute the switching processing routine in FIG. 10. The detailed switching processing routine is described later.

In Step S5, the sequence processor 15 calculates coordinates of all the objects 60 that should be displayed on the lanes R in the game screen 50. By way of an example, the calculation is made as follows. First, the sequence processor 15 determines which operation guide domain is currently disposed in the upper portion of the game screen 50. And, the lane group disposed in the upper portion is identified. Next, the sequence processor 15 determines the lane R on which the object 60 should be disposed based on the specification of the lane R correlated with the operation timing included in the display range, namely, the specification of one of "button 1" to "button 5" in the example in FIG. 6 or 7. And, the sequence processor 15 determines the position of each object 60 in a time axis direction (that is, the moving direction of the object 60) from each of the decision lines 55A and 55B according to a time difference between the operation timing and the current time. Therefore, the coordinate of each object 60, which is necessary to dispose each object 60 along the time axis from each of the decision lines 55A and 55B on each specified lane R of the upper operation guide domain, can be obtained.

In Step S6, the sequence processor 15 generates the image data necessary to draw each of the operation guide domains 52A and 52B based on the coordinate of each object 60 calculated in Step S5. Specifically, the sequence processor 15 generates the image data such that each object 60 is disposed in the calculated coordinate. The images such as the object 60 may be acquired from the image data 27. In Step S7, the sequence processor 15 outputs the image data to the display controller 12. Therefore, the operation guide domains 52A and 52B and the objects 60 are displayed on the monitor 5. When ending the processing in Step S7, the sequence processor 15 ends the current sequence processing routine. By repeatedly executing the above pieces of processing, the object 60 is displayed while moving on the upper lane group such that the object 60 arrives at the decision line of the upper operation guide domain in the operation timing described in the sequence data 28.

Figure 9:
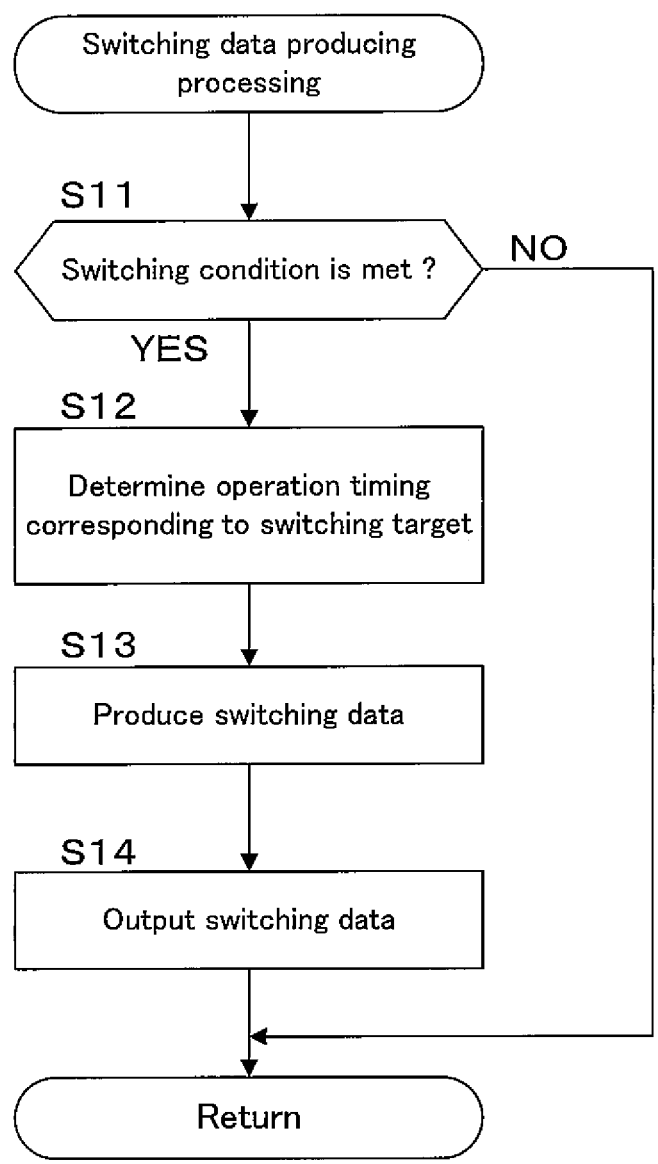
FIG. 9 is a view illustrating an example of a flowchart of a switching data producing processing routine.

The switching data producing processing routine in FIG. 9 will be described below. When the switching data producing processing routine in FIG. 9 is started, the sequence processor 15 determines whether or not a switching condition as a predetermined condition is met in Step S11. As an example of the switching condition, there is applied the condition such that the case that the player gains a given score or more, or the case that the musical performance operation of the player is highly valued for successive predetermined times or more. As the switching condition in the case that the upper second operation guide domain 52B is replaced with the lower first operation guide domain 52A, there may be adopted a condition that a low score is given to the musical performance operation of the player for successive predetermined times or more. When the negative determination is made in Step S11, namely, when the switching condition is not met, the following pieces of processing are skipped to end the current routine.

On the other hand, when the affirmative determination is made in Step S11, namely, when the switching condition is met, the flow goes to Step S12. In Step S12, the sequence processor 15 determines the operation timing corresponding to the switching target from the sequence data 28. By way of an example, the determination in Step S12 is made as follows. First, the sequence processor 15 identifies the timing meeting the switching condition, and identifies all the objects 60 displayed in the upper operation guide domain in the timing. And, the operation timing on the sequence data 28 corresponding to each of all the identified objects 60 is determined as the operation timing corresponding to the switching target. In addition, the timing in which the switching target is identified is not limited to the embodiment in which the timing meeting the switching condition is directly utilized. For example, the timing, which is subsequent to the timing meeting the switching condition and in which the disadvantageous operation timing is not included in the switching target, may be used as the timing in which the switching target is identified. That is, in addition to the conditions such as the score condition described above and the estimation condition of the musical performance operation of the player, a given condition on the sequence data 28 etc. may be added to the switching condition. For example, as an example of the additional condition like this, there may be used the timing after the elapse of a given time for which the production etc. is executed after the switching condition is met.

In Step S13, the sequence processor 15 produces the switching data in which each piece of operation timing determined in Step S12 is described. In Step S14, the sequence processor 15 outputs the switching data produced in Step S13, and ends the current routine. As an example of an output destination in Step S14, a predetermined domain of the internal storage device of the control unit 10 may be used to temporarily store the switching data. In addition, the same embodiment as the operation sequence unit 28b, in which only the corresponding operation timing is described, may be utilized as an example of an embodiment of the switching data. A period according to the switching condition, such as a period in which the score of the player is updated and a period in which the musical performance operation of the player is estimated, may be adopted as the period in which the routine in FIG. 9 is executed.

Figure 10:
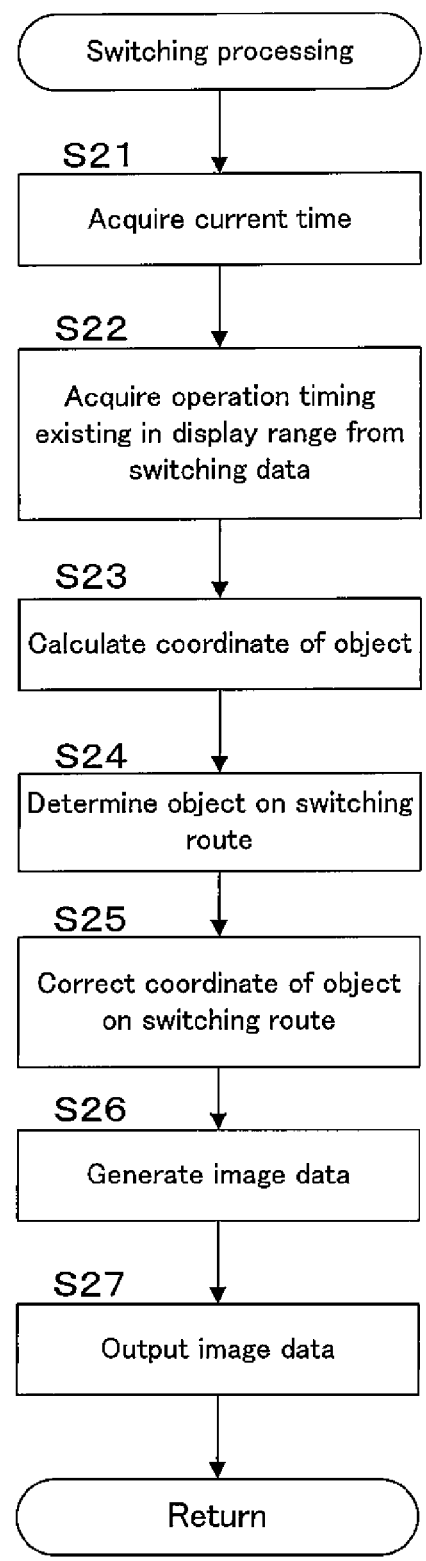
FIG. 10 is a view illustrating an example of a flowchart of a switching processing routine.

Next, the switching processing routine in FIG. 10 will be described below. When the switching processing routine in FIG. 10 is started, the sequence processor 15 acquires the current time on the musical composition in Step S21. For example, the sequence processor 15 may acquire the current time in the same way as the sequence processing routine in Step S1 in FIG. 8. In Step S22, the sequence processor 15 acquires the data of the operation timing existing in the time length corresponding to the display range of each of the operation guide domains 52A and 52B from the switching data. The display range is set similarly to the display range in Step S3 of the sequence processing routine in FIG. 8.

In Step S23, the sequence processor 15 calculates the coordinates of all the objects 60 on the lanes R. For example, the calculation may be executed similarly to the calculation in Step S5 of the sequence processing routine in FIG. 8. In Step S24, the sequence processor 15 determines the object 60 on the switching route based on the calculation result in Step S23. By way of an example, the determination in Step S24 is made as follows. First, the sequence processor 15 sets a predetermined range to make the hole CH in the upper lane group. Then the sequence processor 15 sets the connection route that extends to the lower lane group from the position (closest to the position in which the object 60 emerges) on the depth side in the set predetermined range to connect the upper lane group and the lower lane group. The predetermined range may be set in each musical composition. For example, the position corresponding to position in which the object 60 arrives at the decision line on the lower lane after 10 frames may be set in the position on the depth side. Then the sequence processor 15 identifies the range on the connection route and the range to the decision line from the connection position with the connection route of the lower lane R as the switching route. And, based on the calculation result in Step S23, the sequence processor 15 identifies each object 60, which corresponds to the coordinate in the predetermined range set to the upper lane group, as the object 60 that should be disposed on the switching route.

In Step S25, the sequence processor 15 corrects the coordinate of the object 60 that should be disposed on the switching route to the coordinate on the switching route such that the moving speed of the object 60 becomes a predetermined speed. The coordinate calculated in Step S23 is corrected such that the continuity of the position of the object 60 is maintained before and after the moving route extends in association with the switching. Specifically, the coordinate calculated in Step S23 is replaced with the coordinate on the switching route, and the coordinate is corrected such that, in consideration of the coordinate before the replacement and a remaining time to the operation timing, the replaced coordinate is matched with the actual coordinate of the object 60 on the switching route in the operation timing that should be guided by the object 60. And, for example, as the predetermined speed, there is set a speed, which is faster than the moving speed of the object 60 on the upper lane group and is not in adequate to the guidance of the operation timing, so as to correspond to the extension of the travel distance with the switching of the lane.

In Step S26, the sequence processor 15 generates the image data necessary to draw the operation guide domains 52A and 52B similarly to Step S6 of the sequence processing routine in FIG. 8. At this point, the image of the hole CH is also generated such that the hole CH is disposed in the predetermined range to connect the upper lane group and the lower lane group. The images such as the hole CH may be acquired from the image data 27. In Step S27, the sequence processor 15 outputs the image data to the display controller 12. Therefore, the image corresponding to the operation guide domains 52A and 52B, the hole CH, the objects 60, and the falling of the object 60 from the hole CH (the image on the connection route) are displayed on the monitor 5. When ending the processing in Step S27, the sequence processor 15 ends the current sequence processing routine. The moving route of the currently-moving object is switched between the upper and lower lanes by repeatedly executing the above pieces of processing. And, the moving route of the object 60 is switched such that the continuity is maintained before and after the switching by connecting the length generated between the upper and lower lanes, and a difference between corresponding positional relationships.

Figure 11:
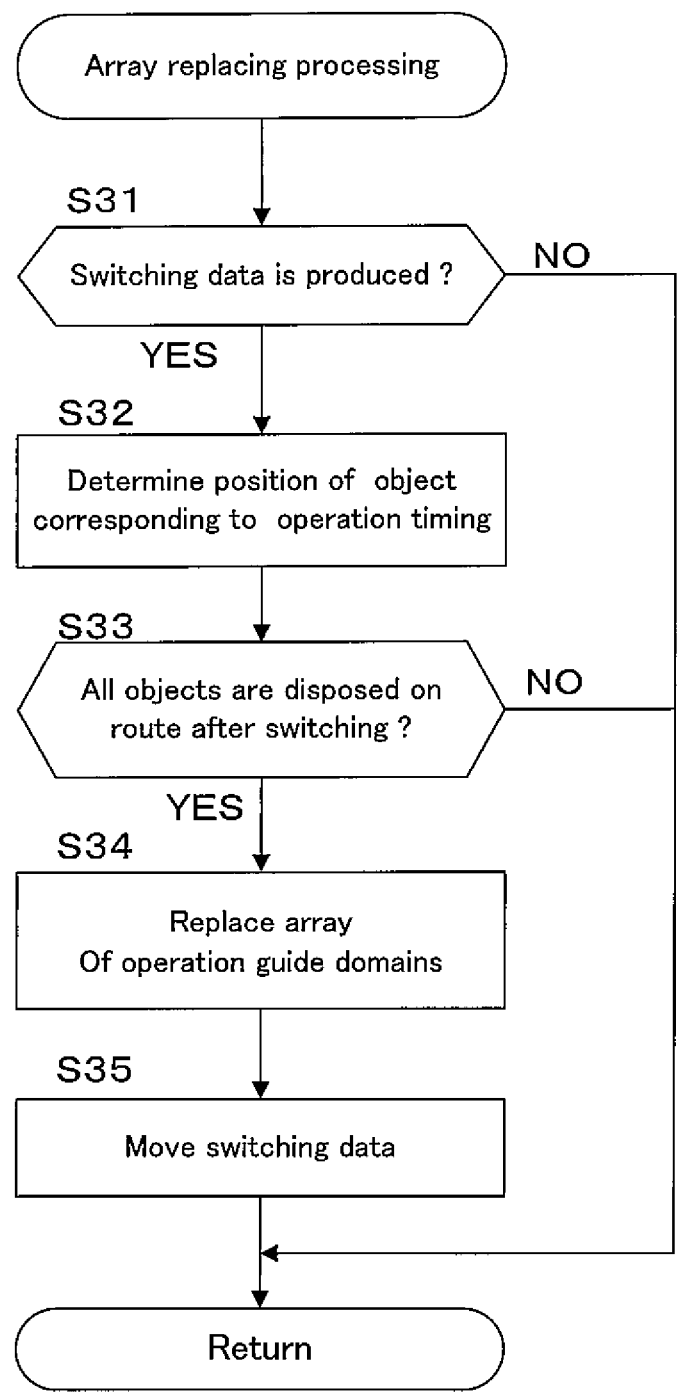
FIG. 11 is a view illustrating an example of a flowchart of an array replacing processing routine.

The array replacing processing routine in FIG. 11 will be described below. When the array replacing processing in FIG. 11 is started, the sequence processor 15 determines whether or not the switching data is produced through the routine in FIG. 9 in Step S31. Specifically, the sequence processor 15 makes the affirmative determination when the switching data exists in a predetermined domain in which the switching data is stored, and the sequence processor 15 makes the negative determination when the switching data does not exist in the predetermined domain. When making the negative determination in Step S31, the sequence processor 15 skips the following pieces of processing, and ends the current routine.

On the other hand, when the affirmative determination is made in Step S31, the flow goes to Step S32. In Step S32, the sequence processor 15 determines the position of the object 60 corresponding to the operation timing described on the produced switching data. Specifically, the sequence processor 15 acquires the coordinate in which the object 60 corresponding to the operation timing on the switching data is actually disposed, and the sequence processor 15 determines whether the object 60 is disposed on the upper or lower lane group based on the acquired coordinate. In Step S33, based on the determination result in Step S32, the sequence processor 15 determines whether or not the coordinate of all objects 60 (may exclude the object 60 in which the operation timing elapses) corresponding to the operation timing on the switching data are disposed on the route after the switching, namely, on the lane after the switching. When the negative determination is made in Step S33, namely, when the object 60 that is not disposed on the lane after the switching exists, the sequence processor 15 skips the following pieces of processing, and ends the current routine.

On the other hand, when the affirmative determination is made in Step S33, namely, when each object 60 corresponding to the operation timing on the switching data is disposed on the lane after the switching, the sequence processor 15 replaces the operation guide domains 52A and 52B with each other in the vertical array. Specifically, the array position are replaced such that the lower operation guide domain is disposed in the upper portion and such that the upper operation guide domain is disposed in the lower portion. At this point, the operation guide domains are deviated from each other in the depth direction such that the upper operation guide domain is located on the depth side while the lower operation guide domain is located on the front side. The vertical lightness is also inverted in association with the replacement. Specifically, the lightness is also inverted in association with the replacement such that the lightness of the upper operation guide domain becomes higher while the lightness of the lower operation guide domain becomes lower.

In Step S35, the sequence processor 15 moves the switching data stored in the predetermined domain to another domain where the switching data can be referred to through the routine in FIG. 10. That is, in the routine in FIG. 10, the switching data existing in one of the predetermined domain and another domain can be referred to while identity of the reference data is maintained. On the other hand, the switching data does not exist in the predetermined domain through the processing in Step S35. In the routine in FIG. 11, determination whether or not the switching data exists in the predetermined domain is made in Step S31. However, at this point, even if the switching data exists in another domain, the affirmative determination is not made in Step S31. Therefore, in association with the movement of all objects 60 corresponding to the operation timing on the switching data to the lane after the switching, the operation guide domains are replaced with each other, and correction of the coordinate of the object 60 corresponding to the operation timing is continuously executed in the routine in FIG. 10 after the switching until the operation timing on the switching data comes. And, when ending the processing in Step S35, the sequence processor 15 ends the current routine. In addition, in the case that the switching data used in the past exists in another domain in Step S35, the past switching data is deleted so as to be updated to the latest switching data, and only the switching data that currently becomes the moving target is stored.

Figure 12:
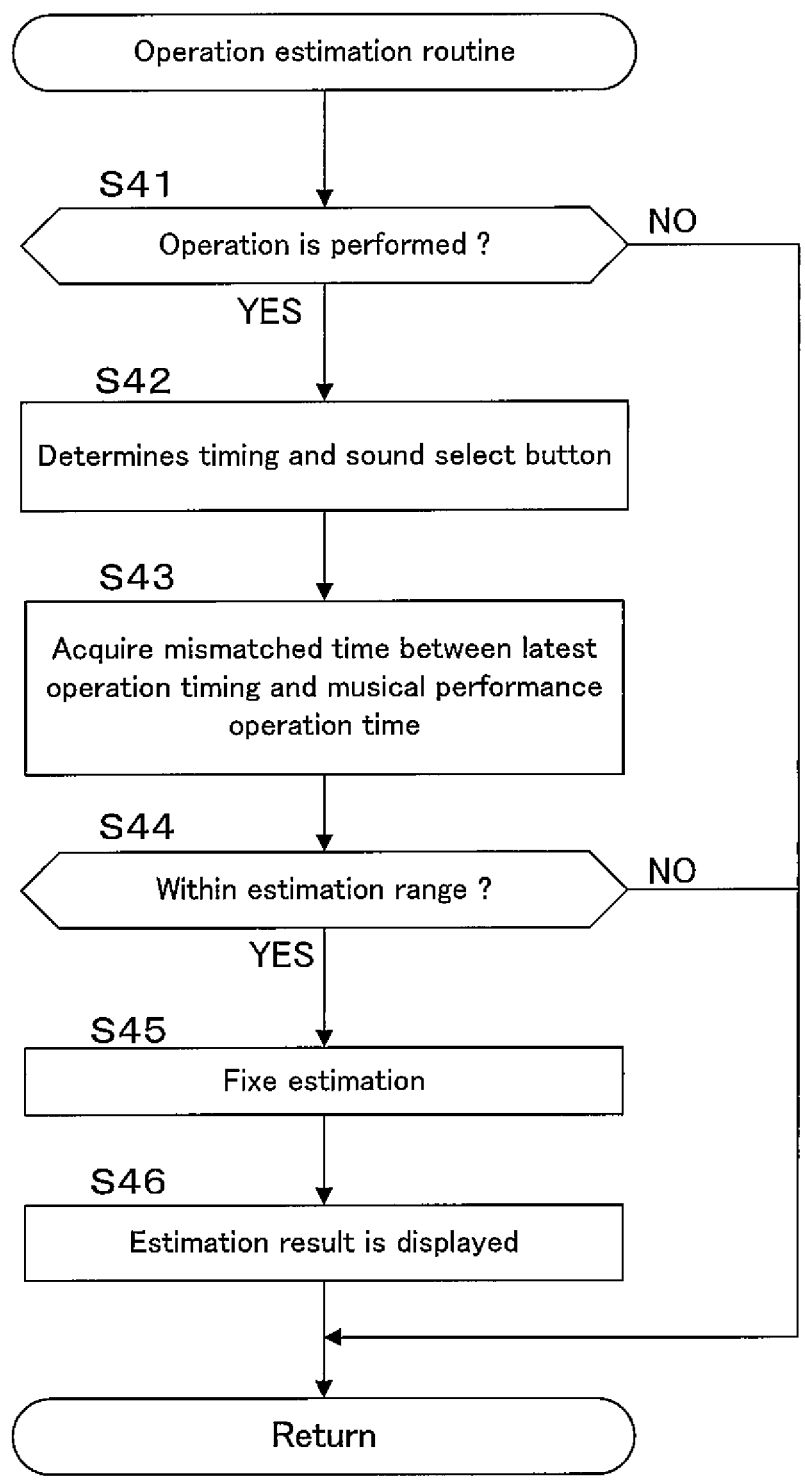
FIG. 12 is a view illustrating an example of a flowchart of an operation estimation processing routine.

Next, the operation estimation routine in FIG. 12 will be described below. When the operation estimation routine in FIG. 12 is started, in Step S41, the operation estimation unit 16 refers to the output signal of the guitar controller 4, and determines whether or not the musical performance operation is performed to the guitar controller 4, namely, the existence or non-existence of the signal operating the picking lever 9 while at least one of the sound select buttons 8G to 8O is selected. At this point, when only the picking lever 9 is operated, or when only one of the sound select buttons 8G to 8O is selected, the operation estimation unit 16 determines that the musical performance operation is not performed. When the musical performance operation is not performed, the operation estimation unit 16 ends the current routine. When the musical performance operation is performed, the flow goes to Step S42.

In Step S42, based on the signal output from the guitar controller 4, the operation estimation unit 16 determines the timing (the time on the musical composition) in which the musical performance operation is performed and the sound select button that is selected at that time. In Step S43, the operation estimation unit 16 identifies the latest operation timing described in the sequence data 28 with respect to the sound select button selected as the musical performance operation, namely, the temporally closest operation timing on the sequence data 28 with respect to the sound select button that is selected during the musical performance operation, and the operation estimation unit 16 acquires the mismatched time between the operation timing and the time that the touch operation is performed.

In Step S44, the operation estimation unit 16 determines whether or not the operation of the player is proper based on whether or not the mismatched time is within an estimation range. The estimation range is set around the operation timing of the comparison target with a predetermined time range. For example, levels are set around the operation timing, and a time range where the levels are set is dealt with as the estimation range. When the mismatched time is out of the estimation range in Step S44, the operation estimation unit 16 ends the current routine. When the mismatched time is within the estimation range in Step S44, the flow goes to Step S45.

In Step S45, the operation estimation unit 16 fixes an estimation to the musical performance operation of the player based on the mismatched time acquired in Step S44. For example, the estimation is implemented based on the determination which level set in the time range the timing of the musical performance operation belongs to. The levels are set such that the time range is divided into constant periods. The operation of the player is highly valued as the period comes closer to the operation timing.

After Step S45 has been executed, the operation estimation unit 16 proceeds to Step S46, and controls the output to the display controller 12 such that the estimation result is displayed on the game screen 50. When ending the processing in Step S46, the operation estimation unit 16 ends the current routine. Therefore, the mismatched time is detected between the timing of the musical performance operation of the player and the guided operation timing, and the musical performance operation of the player is estimated based on the mismatched time.

As described above, the two operation guide domains 52A and 52B including the lane groups R1 and R2 in which the numbers of lanes differ from each other are vertically disposed, and the moving route of the object 60 is switched between the lane groups R1 and R2 according to the predetermined switching condition. For example, when the first operation guide domain 52A having the smaller number of lanes is disposed in the upper portion, and the conditions such as a given score and successive high estimation are adopted as the predetermined condition, if the play level of the player is highly valued, the moving route of the object 60 disposed on the first lane group R1 is switched to the lower second lane group R2 having the larger number of lanes. The operation timing that should be guided by the object 60 of which the moving route is switched does not change before and after the switching. Therefore, the travel distance of the object 60 is increased due to the differences of the positions and lengths of the upper and lower lane groups R1 and R2, so that the moving speed of the object 60 can be enhanced. The number of available lanes is also increased by switching the lane group used as the moving route, so that the number of sound select buttons 8G to 8O that become the guidance targets can also be increased. Therefore, the difficulty level of the game can be enhanced in the progress of the game according to the play level of the player. For example, contrary to the above switching, the lane group used as the moving route of the object 60 can be switched from the second lane group R2 of the second operation guide domain 52B to the first lane group R1 of the first operation guide domain 52A. Therefore, the difficulty level of the game can be lowered. That is, the difficulty level of the game can be changed in the progress of the game according to the play level of the player by adopting the condition corresponding to the play level of the player as the switching condition.

The object 60 moves from the upper lane group to the lower lane group such that the continuity is maintained, and the object 60 moves on the lane after the movement such that the continuity is maintained. Therefore, since the difference in positions between the upper and lower lanes can naturally be connected, the movement between the lane groups can naturally be produced.

In the above embodiment, the external storage device 20 of the game machine 1 serves as a musical composition data storage device and a sequence data storage device. The control unit 10 serves as a operation guide device, a operation timing determination device, a guide domain presenting device, a sign position control device, a route switching device, and a domain replacing device by causing the sequence processor 15 to execute the routines in FIGS. 8, 9, 10, and 11. Further, the control unit 10 serves as a estimation device by causing the operation estimation unit 16 to execute the routine in FIG. 12.

The invention is not limited to the embodiment described above, but various changes and modifications can properly be made. In the above embodiment, the operation guide domains are disposed while vertically deviated from each other. However, the invention is not limited to the embodiment. For example, the operation guide domains may be disposed while horizontally deviated from each other. In this case, for example, the route can be switched to the operation guide domain including five lanes, which is disposed while deviated in one of the right and left directions, from the operation guide domain including the three lanes. In this case, one decision line that is commonly used in both the operation guide domains may be set as the operation reference sign. For example, the operation guide domains may be disposed while deviated in the depth direction such that the lanes between the operation guide domains are continued. In this case, the route may be switched such that the operation instruction sign goes gradually into the route of the front-side operation guide domain as the operation instruction sign moves toward the front-side from the route of the depth-side operation guide domain. In the above embodiment, the lane R extends from the depth side toward the front side. There is no limitation to the route. For example, the lane that extends from the upper portion toward the lower portion may be used as the route.

The invention is not limited to the embodiment in which all the operation guide domains are displayed on the game screen. For example, a degree of transparency may be adjusted such that each operation guide domain except the domain used to displace the operation instruction sign is displayed according to the progress status of the game, the provision of the switching condition, or the like. In the above embodiment, the positions of the operation guide domains are replaced with each other by switching the route. The invention is not limited to the embodiment. For example, as described above, the operation guide domains may be distinguished from each other before and after the switching by adjusting the degree of transparency. In this case, the routine (domain replacing device) in FIG. 11 may be eliminated.

In the above embodiment, the operation unit is identified by utilizing the route divided in each operation unit. There is no limitation to the identification of the operation unit as long as the operation unit can be identified. For example, the operation instruction sign in which the operation unit can be identified by the color corresponding to the operation unit may be utilized.

In the above embodiment, the second operation guide domain 52B to which the five routes corresponding to the operation units are set and the first operation guide domain 52A to which the three routes corresponding to part of the operation units are set are set as the operation guide domains. There is no limitation to each operation guide domain as long as the route having the correspondence relationship with one of the operation units is set. For example, the route, which has the correspondence relationship with one of the operation units and in which the number of routes is larger than the number of operation units, may be adopted as the operation guide domain.

In the above embodiment, the estimation result to the operation of the player such as the score is utilized as the predetermined condition that the route is switched. There is no limitation to the predetermined condition. For example, as the predetermined condition, there may be utilized an option set in the progress of the game, the elapsed time, the previous setting of the difficulty level, the specified operation to the operation unit, or the like.

In the above embodiment, the sequence data 28 in each operation guide domain corresponding to the same musical composition is prepared as the sequence data 28. There is no limitation to the sequence data. For example, only the sequence data for the second operation guide domain is prepared, and the instruction of the operation timing corresponding to the operation unit that is not included in the lane group R1 of the first operation guide domain may be ignored when the first operation guide domain is disposed in the upper portion. Or, as sequence data that is commonly used in each of operation guide domains, there may be utilized sequence data that the operation timing is described so as to be able to be distinguished in each operation guide domain. For example, as the sequence data like this, there is utilized sequence data that the instruction to switch the operation guide domain is described, and the utilized operation guide domain may be switched before and after the instruction.

In the above embodiment, the relative displacement is generated between the operation instruction sign and the operation reference sign by moving the operation instruction sign toward the operation reference sign. There is no limitation to the above. For example, the operation reference sign may move toward the operation instruction sign, or both the operation instruction sign and the operation reference sign may move so as to come close to each other.

In the above embodiment, the guitar controller that emulates the guitar is used as the input device. The input device is not limited to the guitar controller that emulates the guitar. For example, the controller that emulates a drum set, the controller in which the various buttons are provided in the chassis retained by the player, and a touch panel may be applied to the input device.

In the above embodiment, the music game in which the operation instruction sign moves toward the operation reference sign based on the musical performance time of the musical composition is executed as the game. The invention is not limited to the embodiment. For example, a game that issues the instruction to the player for the performance timing and the performance, such as a flag raising game that issues the instruction to raise a flag in tune with the arrival of the operation instruction sign at the operation reference sign, may be executed in the game machine 1. The operation estimation routine (estimation device) in FIG. 12 may be eliminated according to the necessity of the game executed in the game machine 1.

The game system of the invention may be constructed in proper embodiments such as a game system constructed by utilizing a network, or a game system applied to various types of game machines such as an arcade game machine installed in a commercial facility, a home stationary game machine, and a portable game machine.

The invention claimed is:

1. A game system comprising:
an input device that includes at least one operation unit;
a display device that displays and outputs a game screen;
a sequence data storage device that stores sequence data in which operation timing of the operation unit during the game is described; and
an operation guide device that provides the operation timing of the operation unit to a player, and
wherein the operation guide device comprises:
an operation timing determination device that determines the operation timing, which is included within a predetermined time range of a current time toward a future on the game, of the operation unit based on the sequence data;
a guide domain presenting device that causes two or more operation guide domains including at least one route corresponding to the operation unit to be displayed on the game screen simultaneously;
a sign position control device that displays an operation instruction sign corresponding to each piece of operation timing determined by the operation timing determination device and an operation reference sign corresponding to the current time in a time ordering array along the route in one of the operation guide domains, and generates a relative displacement according to a time progress of the game between the operation reference sign and the operation instruction sign such that a distance between the operation instruction sign and the operation reference sign is decreased along the route in association with a decrease in time difference between the current time and the operation timing that should be provided by the operation instruction sign, and such that the operation instruction sign is matched with the operation reference sign in the operation timing that should be provided by the operation instruction sign; and a route switching device that switches the route in which the relative displacement is generated between the operation guide domains according to a predetermined condition, and the sequence data includes operation timing corresponding to one of the operation guide domains and operation timing shared by the operation guide domains, and the sign position control device controls display of the operation instruction sign corresponding to each piece of operation timing such that continuity of the relative displacement is maintained before and after switching of the route by the route switching device.

2. A game system, comprising:

an input device that includes at least one operation unit;

a display device that displays and outputs a game screen;

a sequence data storage device that stores sequence data in which operation timing of the operation unit during the game is described; and an operation guide device that provides the operation timing of the operation unit to a player, and wherein the operation guide device comprises:

an operation timing determination device that determines the operation timing, which is included within a predetermined time range of a current time toward a future on the game, of the operation unit based on the sequence data;

a guide domain presenting device that causes operation guide domains including at least one route corresponding to the operation unit to be displayed on the game screen simultaneously;

a sign position control device that displays an operation instruction sign corresponding to each piece of operation timing determined by the operation timing determination device and an operation reference sign corresponding to the current time in a time ordering array along the route in one of the operation guide domains, and generates a relative displacement according to a time progress of the game between the operation reference sign and the operation instruction sign such that a distance between the operation instruction sign and the operation reference sign is decreased along the route in association with a decrease in time difference between the current time and the operation timing that should be provided by the operation instruction sign, and such that the operation instruction sign is matched with the operation reference sign in the operation timing that should be provided by the operation instruction sign; and a route switching device that switches the route in which the relative displacement is generated between the operation guide domains according to a predetermined condition, and the sequence data includes operation timing corresponding to one of the operation guide domains and operation timing shared by the operation guide domains, and the sign position control device controls display of the operation instruction sign corresponding to each piece of operation timing such that continuity of the relative displacement is maintained before and after switching of the route by the route switching device, wherein the operation guide domains have a position relative to each other on the game screen, further comprising a domain replacing device that switches the relative position of at least one of the operation guide domains corresponding to the routes before and after the switching after the route switching device switches the route.

3. The game system according to claim 1, wherein the guide domain presenting device cause the operation guide domains to emerge on the game screen such that the operation guide domains are deviated from each other in a up and down direction.

4. The game system according to claim 3, wherein the guide domain presenting device displays a route that extends from a depth side of the game screen toward a front side as the route, and cause the operation guide domains to emerge in an array in which the operation guide domains are deviated in a depth direction so as to be gradually located on the front side of the game screen from the upper operation guide domain toward the lower operation guide domain.

5. The game system according to claim 3, wherein the sign position control device utilize the route in the uppermost operation guide domain in the operation guide domains as the route in which the relative displacement is generated.

6. The game system according to claim 1, wherein the guide domain presenting device causes each operation guide domain to emerge with different lightness values before and after the route switching device switches the route such that the operation guide domain can be distinguished before and after the switching.

7. The game system according to claim 1, wherein the sign position control device displays the operation reference sign in each of the operation guide domains.

8. The game system according to claim 1, wherein the operation units are provided in the input device, the operation timing are described in the sequence data while correlated with information specifying one of the operation units, and the operation guide device displays the operation instruction sign in an aspect in which the operation unit correlated with each operation timing can be distinguished.

9. The game system according to claim 8, wherein the guide domain presenting device cause the route divided in each operation unit to emerge in each of the operation guide domains, and the sign position control device utilize each route of each of the operation guide domains as the route in which the operation instruction sign and the operation reference sign are displayed in an array of the time order, whereby the operation guide device displays the operation instruction sign in the aspect in which the operation unit corresponding to each piece of operation timing can be distinguished.

10. The game system according to claim 9, wherein the guide domain presenting device causes the operation guide domains to emerge on the game screen such that each operation guide domain having the different number of routes is included in the operation guide domains.

11. The game system according to claim 1, wherein the sign position control device generates the relative displacement by moving the operation instruction sign toward the operation reference sign.

12. The game system according to claim 1, further comprising an estimation device that estimates timing of an operation to the operation unit based on the operation timing specified by the sequence data.

13. The game system according to claim 12, wherein the route switching device utilizes the estimation result of the estimation device as the predetermined condition.

14. The game system according to claim 1, further comprising:

an audio output device that plays back and outputs a sound;

a musical composition data storage device that stores musical composition data which is used to play back the musical composition; and a musical composition playback device that plays back the musical composition from the audio output device based on the musical composition data, and wherein the operation timing of the operation unit in playing back the musical composition is described in the sequence data.

15. The game system according to claim 1, wherein a guitar controller that emulates a guitar is used as the input device, the guitar including a body, a neck extending from the body, and a head disposed at a leading end of the neck.

16. A method of controlling a computer incorporated in a game machine comprising: an input device that includes at least one operation unit; a display device that displays and outputs a game screen; a sequence data storage device that stores sequence data in which operation timing of the operation unit during the game is described; and wherein the method of controlling the computer comprises an operation guide step that provides the operation timing of the operation unit to a player, and the operation guide device further includes:
an operation timing determination step that determines the operation timing, which is included within a predetermined time range of a current time toward a future on the game, of the operation unit based on the sequence data;

a guide domain presenting step that causes two or more operation guide domains including at least one route corresponding to the operation unit to be displayed on the game screen simultaneously;

a sign position control step that displays an operation instruction sign corresponding to each piece of operation timing determined in the operation timing determination step and an operation reference sign corresponding to the current time in a time ordering array along the route in one of the operation guide domains, and generates a relative displacement according to a time progress of the game between the operation reference sign and the operation instruction sign such that a distance between the operation instruction sign and the operation reference sign is decreased along the route in association with a decrease in time difference between the current time and the operation timing that should be provided by the operation instruction sign, and such that the operation instruction sign is matched with the operation reference sign in the operation timing that should be provided by the operation instruction sign; and a route switching step that switches the route in which the relative displacement is generated between the operation guide domains according to a predetermined condition, and as the sequence data, sequence data including operation timing corresponding to one of the operation guide domains and operation timing shared by the operation guide domains is used, and the sign position control step includes a step that controls display of the operation instruction sign corresponding to each piece of operation timing such that continuity of the relative displacement is maintained before and after switching of the route in the route switching step.

\* \* \* \* \*